United States Patent
Tokutake

(10) Patent No.: US 9,389,716 B2
(45) Date of Patent: Jul. 12, 2016

(54) MOBILE TERMINAL APPARATUS

(75) Inventor: Kenji Tokutake, Kanagawa (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 400 days.

(21) Appl. No.: 13/555,641

(22) Filed: Jul. 23, 2012

(65) Prior Publication Data

US 2013/0076688 A1 Mar. 28, 2013

Related U.S. Application Data

(60) Provisional application No. 61/538,234, filed on Sep. 23, 2011.

(51) Int. Cl.
*G06F 3/041* (2006.01)
*G06F 3/044* (2006.01)
*G06F 1/16* (2006.01)

(52) U.S. Cl.
CPC ............ *G06F 3/0412* (2013.01); *G06F 1/1616* (2013.01); *G06F 3/044* (2013.01); *G06F 2203/04101* (2013.01); *G06F 2203/04106* (2013.01)

(58) Field of Classification Search
CPC .......... G06F 3/044; G06F 2203/04101; G06F 2203/04106
USPC ...................... 345/173–178; 178/18.01–20.01
See application file for complete search history.

(56) References Cited

U.S. PATENT DOCUMENTS

| | | | |
|---|---|---|---|
| 2009/0244023 A1* | 10/2009 | Kim et al. | 345/173 |
| 2010/0171027 A1* | 7/2010 | Yun | 250/221 |
| 2010/0173679 A1* | 7/2010 | Moon | 455/566 |
| 2012/0044196 A1* | 2/2012 | Mizuhashi | G06F 1/32 345/174 |
| 2012/0069772 A1* | 3/2012 | Byrne et al. | 370/255 |
| 2012/0208601 A1* | 8/2012 | Lockwood | 455/566 |

FOREIGN PATENT DOCUMENTS

| | | |
|---|---|---|
| JP | 2011-172078 | 1/2011 |
| JP | 2011-070525 | 7/2011 |

OTHER PUBLICATIONS

U.S. Appl. No. 13/562,815, filed Jul. 31, 2012, Tokutake.
U.S. Appl. No. 14/097,031, filed Dec. 4, 2013, Tokutake.

* cited by examiner

*Primary Examiner* — David Tung
(74) *Attorney, Agent, or Firm* — Oblon, McClelland, Maier & Neustadt, L.L.P.

(57) ABSTRACT

A terminal apparatus that includes a touch panel; a proximity detection unit configured to detect an approach and contact of an external object to the touch panel based on a changed in capacitance value and to detect a location on a surface of the touch panel where the capacitance value changed; and an operation control unit configured to control the proximity detection unit to stop the detection of a location contacted by the external object on the touch panel surface when the approach of the external object is detected by the proximity detection unit.

9 Claims, 16 Drawing Sheets

MOBILE TERMINAL APPARATUS

CROSS REFERENCE TO RELATED APPLICATIONS

This application is related to and claims priority under 35 U.S.C. §119(e) to Provisional Application Ser. No. 61/538,234, filed Sep. 23, 2011, the contents of which are hereby incorporated herein by reference.

BACKGROUND

1. Field

The present specification relates to a personal digital assistant including a touch panel which can detect contact or the like of an external conductor such as a user's finger or the like by detecting change in capacitance.

2. Description of the Related Art

In recent years, highly-functional personal digital assistants having phone call functions called so-called smart phones have come into widespread use. This highly-functional personal digital assistant frequently includes a touch panel as an operation input device for a user. Note that touch panels may be equipped to not only highly-functional personal digital assistants but also conventional cellular telephones for performing audio phone calls. With the following description, these highly-functional personal digital assistants and conventional personal digital assistants which have phone call functions will not be distinguished, and will be referred to as personal digital assistants.

Also, the above personal digital assistant includes, in addition to a phone call application program for an audio phone call, various application programs, for example, such as an e-mail application program for performing creation of an e-mail, and an outgoing call/incoming call, a Web application program for performing Web connection, display of a Web screen thereof, and so forth, and so forth.

Of multiple application programs that a conventional personal digital assistant includes, the phone call application program is made to be a program that can also execute, in addition to outgoing/incoming call processing at the time of an audio phone call, and actual audio phone call processing, other processing relating to this audio phone call.

Here, as one of programs for executing other processing relating to the audio phone call, the phone call application program also includes a program that executes processing for suspending a display panel or touch panel at the time of an audio phone call being performed. That is to say, after receiving incoming of an audio phone call, when a user moves this personal digital assistant to his/her ear to perform the phone call, this causes this terminal to be in generally erected state, and also to come close to the user's head, the phone call application program can also execute processing for suspending the display panel and touch panel.

Description will be made below regarding details of the processing for the personal digital assistant suspending the display panel and touch panel at the time of the phone call application program being executed, with reference to FIG. 20, FIG. 21, and FIG. 22.

FIG. 20 illustrates a schematic view with a conventional personal digital assistant 100 as viewed from the side face.

As shown in this FIG. 20, this personal digital assistant 100 includes a display panel 101, and also, a touch panel having a size generally covering the display screen thereof is provided to the front surface of this display panel 101.

The touch panel has a configuration wherein multiple transparent electrode patterns are arrayed in the X-Y direction on the panel surface made up of transparent sensor glass, and is a device wherein change in capacitance is detected by the transparent electrode patterns thereof, thereby enabling detection that an external conductor such as the user's finger or the like comes into contact with the panel surface, and output of X-Y coordinate position information on the panel surface where this external conductor comes into contact.

Also, the conventional personal digital assistant 100 shown in FIG. 20 includes a proximity sensor 102 in a predetermined position on the screen side of the display panel 101 and also near an edge portion of a casing. This proximity sensor 102 is a device having narrow directivity as shown in a dotted line in FIG. 20 for example, and also takes from the sensor installation surface to distance up to a certain extent as a proximity detection area 105.

Further, the personal digital assistant 100 includes an acceleration sensor within the casing thereof (illustration thereof is omitted in FIG. 20). For example, when the personal digital assistant 100 moves within real space, this acceleration sensor detects acceleration due to movement thereof.

After receiving incoming of an audio phone call, when detecting that this terminal has moved to the user's ear and become a generally erected state, from acceleration information of the acceleration sensor, and also when detecting that this terminal has come closer to the user's head (ear or the like), from the proximity sensor 102, the personal digital assistant 100 having the above configuration executes suspending processing such that the backlight of the display panel 101 is turned off, and a contact detection function of an external conductor using the touch panel is temporarily suspended.

Note that, in the event that the suspending processing is being executed, for example, when detecting from the acceleration information of the acceleration sensor that this terminal has been set to a state different from the generally erected state, or when detecting from the proximity sensor 102 that this terminal has been moved away from the user's head or the like, the personal digital assistant releases suspension of the display panel 101 and touch panel.

FIG. 21 illustrates a schematic software structure diagram at the time of the phone call application program realizing processing for spending the display panel and touch panel based on the detection signals of the proximity sensor and acceleration sensor at the time of an audio phone call. Note that, with this software structure diagram shown in FIG. 21, for convenience of description, the hardware configurations of a proximity sensor 118 (proximity sensor 102 in FIG. 20), an acceleration sensor 116, a touch panel 119, a backlight 117 of the display panel are also drawn.

In this FIG. 21, the touch panel 119 has, as described above, a configuration wherein multiple transparent electrode patterns are arrayed in the X-Y direction on the panel surface of the transparent sensor glass.

A touch panel driver 115 is driver software for performing control of the operation and scanning of the touch panel 119. This touch panel driver 115 performs scanning of each of the transparent electrode patterns in the X direction and Y direction of the touch panel 119 to detect the capacitance value of each transparent electrode pattern, and outputs the coordinate values of each transparent electrode pattern and the detection value of capacitance thereof to a later-described framework.

The acceleration sensor 116 detects acceleration, as described above, when the personal digital assistant 100 moves within real space, for example.

The acceleration sensor driver 112 is driver software for controlling detection of the operation and acceleration of the acceleration sensor 116. When acceleration is detected at the acceleration sensor 116, this acceleration sensor driver 112 outputs the acceleration detection value thereof to a later-described framework 111.

The display backlight 117 is the backlight of the display panel 101.

A backlight driver 113 is driver software for controlling on/off, brightness at the time of on, and so forth of the display backlight 117. This backlight driver 113 controls on/off, and brightness at the time of the display backlight 117 being on, under the control from a later-described framework 111.

The proximity sensor 118 is the proximity sensor 102 in FIG. 20, and is a device having narrow directivity and also predetermined detection distance as shown in the proximity detection area 105.

A proximity sensor driver 114 is driver software for controlling the operation and proximity detection of the proximity sensor 118. When the proximity sensor 118 detects proximity of an external object such as the user's head or the like, this proximity sensor driver 114 outputs a proximity detection signal thereof to a later-described framework 111.

The framework 111 is configured of a proximity detection control/computing unit 123, an acceleration measurement control/computing unit 121, a backlight control unit 122, and a touch detection control/computing unit 124 as a software structure for executing suspending processing for turning off the display backlight 117, and also temporarily suspending the detection function of the touch panel 119 based on the detection signals of the proximity sensor 118 and acceleration sensor 116. Note that the proximity detection control/computing unit 123, acceleration measurement control/computing unit 121, backlight control unit 122, and touch detection control/computing unit 124 of the framework 111 may be formed by an OS (Operating System), or may be formed by the application programs, for example, such as a phone call application program. The phone call application program can cooperate with these frameworks.

The acceleration measurement control/computing unit 121 controls the operation of the acceleration sensor 116 equipped to this personal digital assistant 100 through the acceleration sensor driver 112. Also, based on the acceleration detection value from the acceleration sensor 116 supplied via the acceleration sensor driver 112, the acceleration measurement control/computing unit 121 can compute acceleration applied to this personal digital assistant 100, and also determine, based on computed acceleration value thereof, whether or not the personal digital assistant 100 is in a state close to generally vertical within real space.

The proximity detection control/computing unit 123 controls the operation of the proximity sensor 118 equipped to this personal digital assistant through the proximity sensor driver 114. Also, based on the proximity detection signal of the proximity sensor 118 supplied via the proximity sensor driver 114, the proximity detection control/computing unit 123 can determine the proximity or distancing of the external object as to this personal digital assistant 100.

The backlight control unit 122 controls on/off, brightness at the time of being on, and so forth of the display backlight 117 equipped to this personal digital assistant 100 through the backlight driver 113.

The touch detection control/computing unit 124 controls the operation of the touch panel 119 equipped to this personal digital assistant 100 through the touch panel driver 115, and also at the time of the capacitance value and coordinate values of each transparent electrode pattern being supplied, based on these information, determines what kind of input operation the user performed as to the touch panel 119.

With the framework ill in FIG. 21, after determination is made at the acceleration measurement control/computing unit 121 that this personal digital assistant 100 is in a state generally close to vertical within real space, in the event that determination is made at the proximity detection control/computing unit 123 that the external object has come closer to this personal digital assistant 100, the backlight control unit 122 executes suspending processing for turning off the display backlight 117 through the backlight driver 113, and also, the touch detection control/computing unit 124 executes suspending processing for temporarily suspending the detection function of the touch panel 119 through the touch panel driver 115.

FIG. 22 illustrates a schematic flowchart of processing for the phone call application program suspending the display panel and touch panel based on the detection signals of the proximity sensor and acceleration sensor at the time of an audio phone call.

In this FIG. 22, for example, there has been an incoming call for an audio phone call, and for example, when instruction input (on-hook instruction input) to the effect that this incoming will be received is performed from the user, the phone call application program advances the processing to step S101.

Upon proceeding to the processing in step S101, the acceleration measurement control/computing unit 121 of the framework determines, based on the acceleration detection value from the acceleration sensor 116 supplied via the acceleration sensor driver 112, whether or not this personal digital assistant 100 is, for example, in a state close to generally vertical within real space. Note that the acceleration measurement control/computing unit 121 returns the processing while this personal digital assistant 100 is not in a state close to generally vertical. In the event of determining that this personal digital assistant 100 is in a state close to generally vertical, the phone call application program advances the processing to step S102.

Upon proceeding to the processing in step S102, the proximity detection control/computing unit 123 of the framework starts the operation of the proximity sensor 118 through the proximity driver 114, and executes proximity detection processing of an external object, for example, such as the user's face or the like. Also, the proximity detection control/computing unit 123 determines, based on the proximity detection signal of the proximity sensor 118 supplied via the proximity sensor driver 114, whether or not the external object such as the user's face or the like has come closer to this personal digital assistant 100, as processing of step S103. Upon the proximity of the external object being detected at the proximity sensor 118, the phone call application program advances the processing to step S104. That is to say, after determination is made at the acceleration measurement control/computing unit 121 that this personal digital assistant 100 is in a state close to generally vertical within real space, in the event that determination is made at the proximity detection control/computing unit 123 that the external object has come closer to this personal digital assistant 100, the processing is proceeded to step S104. Note that a long as this personal digital assistant 100 does not come closer to the external object, the phone call application program returns the processing to step S101.

Upon proceeding to the processing in step S104, the backlight control unit 122 of the framework executes suspending processing for turning off the display backlight 117 through the backlight driver 113. Also, the touch detection control/computing unit 124 executes suspending processing for temporarily suspending the detection function of the touch panel 119 through the touch panel driver 115. After this processing in step S104, the phone call application program advances the processing to step S105.

Upon proceeding to the processing in step S105, the proximity detection control/computing unit 123 of the framework determines, based on the proximity detection signal supplied from the proximity sensor 118, through the proximity driver 114, whether or not the external object such as the user's face or the like has come closer to this personal digital assistant 100.

In the event that in step S105 the proximity detection control/computing unit 123 determines that the external object such as the user's face or the like is not moving away from (is close to) this personal digital assistant 100, the phone call application program advances the processing to step S106.

Upon proceeding to the processing in step S106 after the proximity detection control/computing unit 123 determines in step S105 that the external object such as the user's face or the like is not moving away from this personal digital assistant 100, the acceleration control/computing unit 121 determines, based on the acceleration detection value supplied from the acceleration sensor 116, through the acceleration sensor driver 112, whether or not this personal digital assistant 100 maintains a state generally vertical.

In the event that the acceleration control/computing unit 121 determines in step S106 that this personal digital assistant 100 maintains a state close to generally vertical, the phone call application program advances the processing to step S108.

Also, in the event that the proximity detection control/computing unit 123 determines in step S105 that the external object such as the user's face or the like has moved away from this personal digital assistant 100, the audio application program advances the processing to step S107.

In the event of proceeding to the processing in step S107 since the external object such as the user's face or the like has moved away from this personal digital assistant 100, the backlight control unit 122 of the framework executes, through the backlight driver 113, resuming processing for turning on the display backlight 117, and the touch detection control/computing unit 124 executes, through the touch panel driver 115, resuming processing for restoring the detection function using the touch panel 119.

Also, in the event that the acceleration control/computing unit 121 determines in step S106 that the personal digital assistant 100 has been changed to another state from a state close to generally vertical, the phone call application program advances the processing to step S107.

In the event of proceeding to the processing in step S107 since the personal digital assistant 100 has been changed to another state from a state close to generally vertical, the backlight control unit 122 of the framework executes, through the backlight driver 113, resuming processing for turning on the display backlight 117, and the touch detection control/computing unit 124 executes, through the touch panel driver 115, resuming processing for restoring the detection function using the touch panel 119.

After the processing in step S107, the phone call application program returns the processing to step S101.

Also, in the event of proceeding to the processing in step S108 after the acceleration control/computing unit 121 determines in step S106 that the personal digital assistant 100 maintains a state close to generally vertical, the phone call application program determines whether or not the audio phone call by the user is completed. Note that end of this audio phone call can be determined based on whether or not end of the call has been performed by the other party of the call, or whether or not off-hook instruction input for end of the phone call has been performed by the user of the personal digital assistant 100, or the like.

In the event that determination is made in step S108 that the audio phone call is completed, the backlight control unit 122 of the framework executes, through the backlight driver 113, resuming processing for turning on the display backlight 117, or the touch detection control/computing unit 124 executes, through the touch panel driver 115, resuming processing for restoring the detection function using the touch panel 119. The audio application program then ends the processing of the flowchart in FIG. 22.

CITATION LIST

Patent Literature

[PTL 1] Japanese Unexamined Patent Application Publication No. 2011-172078

[PTL 2] Japanese Unexamined Patent Application Publication No. 2011-70525

The conventional personal digital assistant is made to be a device which executes processing for suspending the display panel and touch panel, as described above, after receiving incoming of an audio phone call, when the user moves the personal digital assistant to the his/her ear to perform the phone call, whereby this terminal is changed to a generally erected state, and also has come closer to the user's head. Such suspending function of the display panel and touch panel is prepared for preventing the touch panel from erroneously detecting coordinates when the user applies this personal digital assistant to his/her ear at the time of a phone call, and also for reducing power consumption by turning off the backlight of the display panel.

Here, the proximity sensor for detecting that the user's head or the like has come closer to the personal digital assistant is, as shown in FIG. 20, made to be a device having narrow directivity and also having distance somewhat away from the sensor installation surface as a proximity detection area. That is to say, in other words, with the proximity sensor, a range to detect proximity of the external object or the like (the above proximity detection area) is too narrow, and accordingly, for example, depending on how the user holds this personal digital assistant at the time of the phone call, proximity of the user's face or the like may not be detected.

As described above, in the event that the external object such as the user's face or the like is not accommodated in the detectable area having narrow directivity of the proximity sensor, and this proximity sensor has failed to detect proximity of the user's face or the like, the suspending processing of the display panel and touch panel is consequently not executed. That is to say, in the event that the suspending processing is not executed, the contact detection function of an external conductor in the touch panel is not temporarily suspended, and in this state, for example, when the user's face or the like has come into contact with the touch panel, the coordinates of the contact position are detected by the touch panel. In this way, upon the coordinates of the contact position being detected by the touch panel, processing corresponding to the coordinate position thereof, i.e., malfunction due to execution of an application that the user does not intend occurs. Also, in the event that the suspending processing is not executed, the backlight of the display panel is kept in an on state, and accordingly, unnecessary power is consumed.

According to these, with a personal digital assistant including a touch panel which can detect contact or the like of an external conductor by detecting change in capacitance, at the time of execution of a predetermined application program, for example, such as a phone call application program, the present inventor recognizes necessity for detecting proximity of an external object in a sure manner, and also for enabling predetermined processing, for example, such as suspending processing, to be executed without malfunction.

BRIEF SUMMARY

According to an embodiment, a terminal apparatus includes a touch panel; a proximity detection unit configured to detect an approach and contact of an external object or conductor to the touch panel based on a changed in capacitance value and to detect a location on a surface of the touch panel where the capacitance value changed; and an operation control unit configured to control the proximity detection unit to stop the detection of the location contacted by the external object on the touch panel surface when the approach of the external object is detected by the proximity detection unit.

According to another embodiment, a method, implemented on a terminal apparatus having a touch panel, includes: detecting an approach and contact of an external object or conductor to the touch panel based on a changed in capacitance value; detecting a location on a surface of the touch panel where the capacitance value changed; and stopping the detection of the location contacted by the external object on the touch panel surface when the approach of the external object is detected.

According to another embodiment, a non-transitory computer readable storage medium encoded with computer executable instructions, which when executed by a terminal apparatus having a touch panel, cause the terminal apparatus to perform a method including: detecting an approach and contact of an external object or conductor to the touch panel based on a changed in capacitance value; detecting a location on a surface of the touch panel where the capacitance value changed; and stopping the detection of the location contacted by the external object on the touch panel surface when the approach of the external object is detected.

A personal digital assistant according to an embodiment includes: a display panel unit including a display screen; a touch panel unit, which is additionally provided to the panel surface of the display panel unit, configured to detect approach and contact of an external conductor based on change in an capacitance value, and also to detect coordinate positions on the panel surface where the capacitance value has changed; and an operation control unit configured to measure the size of an area where the capacitance value has changed due to the external conductor coming closer to the touch panel unit, and when the size of this area is equal to or greater than a predetermined size, to temporarily stop the detection operation of coordinate positions due to contact of the external conductor at the touch panel unit, and also to cause the display panel unit to perform predetermined operation. Also, the personal digital assistant according to an embodiment includes: a posture detecting unit configured to detect the posture of the own terminal within real space; with the operation control unit causing, when the posture detecting unit detects that the posture of the own terminal is in a generally erected, vertical, or upright state within real space, the touch panel unit to perform the proximity detection operation of the external conductor.

Also, with the personal digital assistant according to an embodiment, the operation control unit turns off the display panel unit as a predetermined operation when the size of an area where the capacitance value has changed, due to the external conductor coming closer to the touch panel unit, is equal to or greater than the predetermined size.

Also, with the personal digital assistant according to an embodiment, the operation control unit releases temporal stop of the detection operation at the touch panel unit, and the predetermined operation of the display panel unit when detecting, from change in the capacitance value, that the external conductor has moved away from the touch panel unit after temporarily stopping the detection operation of the touch panel unit.

Also, with the personal digital assistant according to an embodiment, the operation control unit changes a cycle for detecting change in the capacitance value at the touch panel unit when the size of an area where the capacitance value has changed due to the external conductor coming closer to the touch panel unit is equal to or greater than the predetermined size.

An operation control method for a personal digital assistant according to an embodiment is an operation control method for a personal digital assistant including a display panel unit including a display screen, and a touch panel unit, which is additionally provided to the panel surface of the display panel unit, configured to detect approach and contact of an external conductor based on change in an capacitance value, and also to detect coordinate positions on the panel surface where the capacitance value has changed. The operation control method according to the present embodiment includes a process for measuring the size of an area where the capacitance value has changed due to the external conductor coming closer to the touch panel unit, and a process for temporarily stopping, when the size of this area is equal to or greater than a predetermined size, the detection operation of coordinate positions due to contact of the external conductor at the touch panel unit, and also causing the display panel unit to perform predetermined operation.

An operation control program for a personal digital assistant according to an embodiment is an operation control program for a personal digital assistant including a display panel unit including a display screen, and a touch panel unit, which is additionally provided to the panel surface of the display panel unit, configured to detect approach and contact of an external conductor based on change in an capacitance value, and also to detect coordinate positions on the panel surface where the capacitance value has changed. The operation control program according to an embodiment causes a computer equipped to the personal digital assistant to serve as an area measuring unit for measuring the size of an area where the capacitance value has changed due to the external conductor coming closer to the touch panel unit, and as an operation control unit for temporarily stopping, when the size of this area is equal to or greater than a predetermined size, the detection operation of coordinate positions due to contact of the external conductor at the touch panel unit, and also causing the display panel unit to perform predetermined operation.

A storage medium according to an embodiment is a storage medium in which there is stored an operation control program for a personal digital assistant including a display panel unit including a display screen, and a touch panel unit, which is additionally provided to the panel surface of the display panel unit, configured to detect approach and contact of an external conductor based on change in an capacitance value, and also to detect coordinate positions on the panel surface where the capacitance value has changed. The operation control program according to an embodiment causes a computer equipped to the personal digital assistant to serve as an area measuring unit for measuring the size of an area where the capacitance value has changed due to the external conductor coming closer to the touch panel unit, and as an operation control unit for temporarily stopping, when the size of this area is equal to or greater than a predetermined size, the detection operation of coordinate positions due to contact of the external conductor at the touch panel unit, and also causing the display panel unit to perform predetermined operation.

That is to say, according to an embodiment, the touch panel unit is used for proximity detection, and accordingly, proximity of an external conductor can be detected with a wide area. Also, according to an embodiment, when proximity of an external object having a predetermined size or greater has been detected by the touch panel, the detection operation of a coordinate position due to contact of the external conductor as to the touch panel unit is temporarily stopped, and accordingly, even if the external conductor comes into contact with the touch panel unit after this temporal stop, the coordinate positions due to this contact is not output from the touch panel unit. Also, according to an embodiment, when proximity of a external object having a size equal to or greater than a predetermined size has been detected by the touch panel unit, predetermined operation can be performed at the display panel unit.

Thus, according to an embodiment, for example, at the time of execution of a predetermined application program, for example, such as a phone call application program or the like, proximity of an external object can be detected in a sure manner, and also, predetermined processing, for example, such as suspending processing can be executed without malfunction. Also, according to an embodiment, a proximity sensor and so forth provided to the conventional system can be eliminated, whereby physical space occupied by this proximity sensor can be eliminated on the device layout, and further, reduction in costs due to deletion of the proximity sensor can also be realized.

DETAILED DESCRIPTION

Description will be made below regarding an embodiment of a highly-functional personal digital assistant including an capacitance type touch panel whereby contact or the like of an external conductor such as the user's finger or the like can be detected by detecting change in capacitance, and also, generally the entire surface of the display screen can be covered, an operation control method and an operation control program of the highly-functional personal digital assistant including the above capacitance type touch panel, and a recording medium in which the operation control program thereof is recorded, as an embodiment, with reference to the drawings.

[Schematic Block Configuration of Personal Digital Assistant Including Touch Panel according to Present Embodiment]

Figure 1:
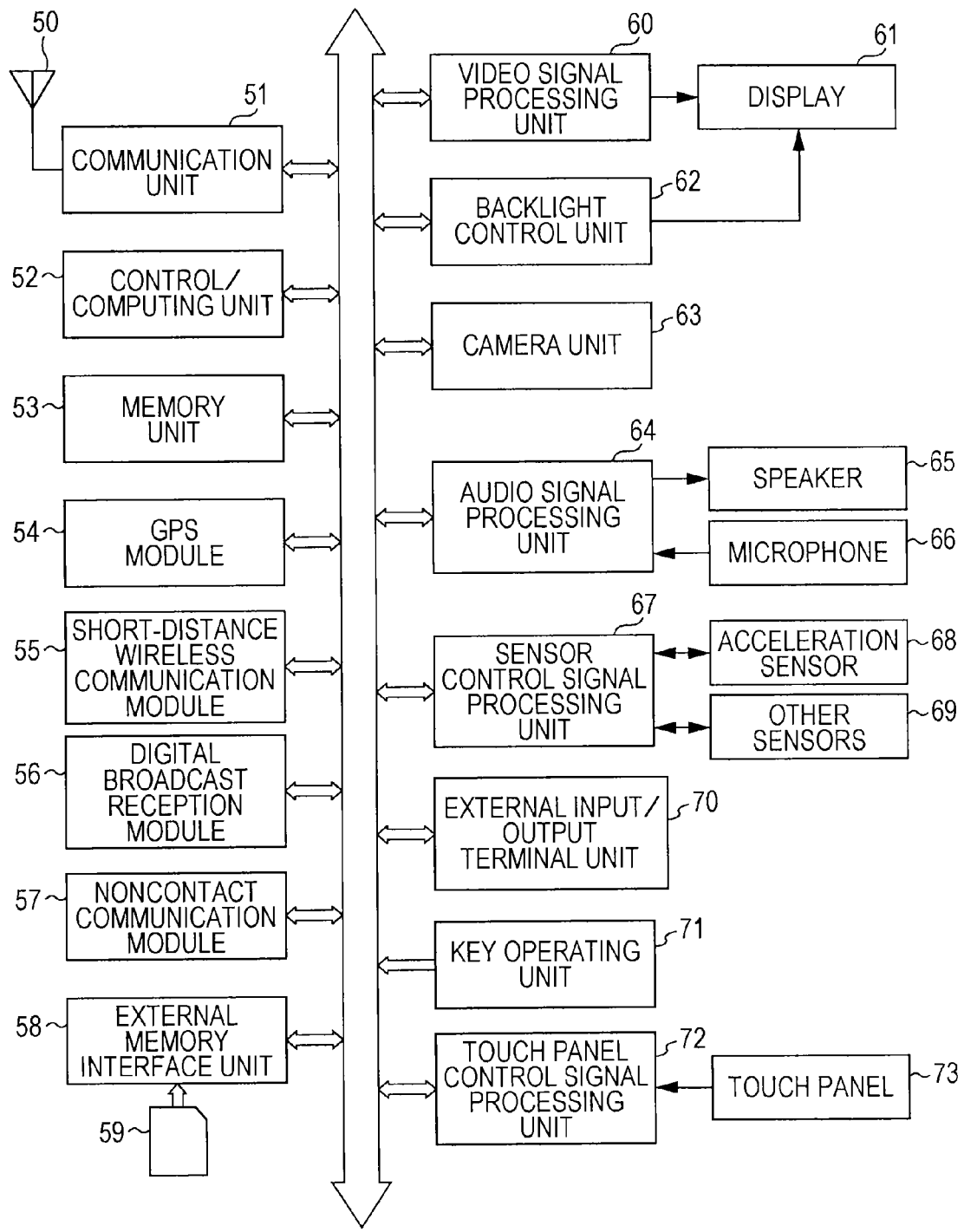
FIG. 1 is a block diagram illustrating a schematic internal configuration example of a personal digital assistant including a touch panel according to the present embodiment.

FIG. 1 illustrates a schematic internal block configuration example of a personal digital assistant including a touch panel 73 according to the present embodiment. Note that the personal digital assistant according to the present embodiment can be applied to various types, for example, such as a highly-functional cellular phone terminal or tablet terminal including the touch panel 73, a digital camera terminal including a touch panel, and so forth.

In FIG. 1, a communication antenna 50 is, for example, a built-in antenna, and performs transmission/reception of a telephone call or e-mail through a cellular phone network or public wireless communication network, downloading of various application programs including a later-described operation control program and so forth, and transmission/reception of signal electric waves for connecting to the Internet or the like. A communication unit 51 includes an antenna circuit and a transmission/reception circuit, and performs the frequency conversion, modulation, demodulation, and so forth of a transmission/reception signal through the cellular phone network or public wireless communication network.

A speaker 65 is a speaker provided to the personal digital assistant according to the present embodiment, and is used for music playback, receiver sound output, ringer tone (ring tone) output, and so forth. A microphone 66 is used for collection of external audio, collection of transmitter sound, and so forth. An audio signal processing unit 64 is configured of an amplifier circuit for the speaker 65, an amplifier circuit for the microphone 66, a decompression decoding circuit for subjecting audio data subjected to compressing encoding supplied from a later-described control/computing unit 52 to decompression decoding, a digital/analog conversion circuit for converting digital audio data after this decompression decoding into an analog audio signal, an analog/digital conversion circuit for converting the analog audio signal input from the microphone 66 into digital audio data, and a compression encoding circuit for subjecting this digital audio data to compression encoding, and so forth, for example. Note that the microphone 66 and speaker 65 can be used for a so-called hands-free phone call.

A video signal processing unit 60 is configured of a decompression decoding circuit for subjecting the video data subjected to compression encoding supplied from the control/computing unit 52 to decompression decoding, and a display panel driving circuit for displaying this digital video after decompression decoding, or the digital broadcast video received at a digital broadcast reception module 56, or the like on a display panel 61, and so forth. Also, in the case of the present embodiment, this video signal processing unit 60 also generates video signals for displaying the desktop image, various menu images, letter input screen, photo images, composited images, virtual keys, virtual button images, and so forth, supplied from the control/computing unit 52, and displays these images on the display panel 61.

A backlight control unit 62 controls on/off and brightness at the time of a backlight provided to the display panel 61 being on.

A key operating unit 71 is configured of hard keys provided onto the casing of the personal digital assistant according to the present embodiment, peripheral circuits thereof, and so forth. This key operating unit 71 converts hard key operation input by a user into an electric signal, amplifies and converts the operation input signal thereof from analog to digital, and transmits the operation input data after analog/digital conversion thereof to the control/computing unit 52.

An external memory interface unit 58 is configured of a slot for external memory from/on which external memory 59 made up of a semiconductor storage medium, or the like is detached/mounted, an interface circuit for external memory data communication, and so forth. With the personal digital assistant according to the present embodiment, various types of data, or various types of application programs can be obtained via a recording medium such as the external memory 59 inserted into this external memory interface 58. Note that, with the personal digital assistant according to the present embodiment, examples of various application programs obtained via this external memory 59 include a later-described phone call application program and electronic wallet application program according to the present embodiment, and predetermined application programs such as a camera application program. The application programs obtained via the external memory 59, and programs separately from these also include an operation control program according to the present embodiment for executing proximity detection of an external object using the touch panel 73, which will be described later, and predetermined processing such as suspending processing based on this proximity detection of the external object.

An external input/output terminal unit 70 is configured of a cable connection connector and an interface circuit for external data communication, for example, at the time of performing data communication through a cable, a charge terminal at the time of charging an internal battery via a power supply cable or the like, and an interface circuit for charge thereof, and so forth. The personal digital assistant according to the present embodiment is configured so as to obtain various types of data and various application programs from an external device connected to this external input/output terminal unit 70. Note that, with the present embodiment, various application programs obtained through this external input/output terminal unit 70 can include a later-described phone call application program and electronic wallet application program according to the present embodiment, and predetermined application programs such as a camera application program. Also, application programs obtained through this external input/output terminal unit 70, or programs obtained otherwise, can include the operation control program according to the present embodiment for performing proximity detection of external objects using a later-described touch panel 73 and predetermined processing based on this proximity detection. Note that the application programs and operation control program according to the present embodiment may be recorded in a disc-shaped recording medium or another recording medium or the like. In this case, for example, the program read out from this recording medium by a recording media playback device included in a personal computer or the like may be supplied to the external input/output terminal unit 70. It goes without saying that an arrangement may be made wherein a recording media playback device is directly connected to the external input/output terminal unit 70, an information processing control program read out by the playback device thereof is supplied to the personal digital assistant according to the present embodiment.

A short-distance wireless communication module 55 is configured of a communication antenna for short-distance wireless electric waves such as a wireless LAN, Bluetooth (registered trademark) or the like, and a short-distance wireless communication circuit. The application programs and operation control program according to the present embodiment may be obtained via this short-distance wireless communication module 55.

A digital broadcast reception module 56 is configured of an antenna and tuner for reception such as so-called digital television broadcasting or digital radio broadcasting or the like. This digital broadcast reception module 56 can receive not only a digital broadcast of one channel but also digital broadcasts of multiple channels at the same time. Also, this digital broadcast reception module 56 can also receive data multiplexed into a digital broadcast. Note that an arrangement may be made wherein the digital broadcast data received at this digital broadcast reception module 56 is, for example, compressed by the control/computing unit 52, and then stored in memory unit 53 or the like. Also, the application programs and operation control program according to the preset embodiment may be broadcasted as one of this digital broadcast data. In this case, these programs are extracted from the digital broadcast data received at the digital broadcast reception module 56 and taken into the personal digital assistant according to the present embodiment.

A noncontact communication module 57 performs noncontact communication, for example, used for so-called RFID (Radio Frequency-Identification) or a noncontact IC card or the like via a noncontact communication antenna. The application programs and operation control program according to the preset embodiment may be obtained via this noncontact communication module 57.

A GPS (Global Positioning System) module 54 includes a GPS antenna, and obtains the latitude and longitude of the current position of the self terminal using the GPS signals from a GPS geodetic satellite. The GPS data (information representing the latitude and longitude) obtained by this GPS module 54 is transmitted to the control/computing unit 52. Thus, the control/computing unit 52 can recognize the current position and movement of the self terminal.

A camera unit 63 is configured of an imaging device, an optical system, and so forth for imaging still images and moving images, and peripheral circuits thereof, and a light driving circuit for emitting imaging auxiliary light, and so forth. Still image data and moving image data at the time of imaging using this camera unit 63 are transmitted to the video signal processing unit 60 as preview video data. Thus, preview video is displayed on the display 61 at the time of shooting with the camera. Also, in the event of recording the still image data and moving image data imaged at the camera unit 63, the imaged still image data and moving image data are transmitted to the control/computing unit 52 for compression, and then stored in the memory unit 53, or external memory 59 connected to the external memory interface unit 58.

An acceleration sensor 68 detects acceleration at the time of this personal digital assistant moving within real space by external pressure or the like being applied, for example.

Other sensors 69 are made up of, as an example, an inclination sensor, an orientation sensor, a temperature sensor, a humidity sensor, an illuminance sensor, and so forth.

A sensor control signal processing unit 67 obtains acceleration from the detection signal from the acceleration sensor 68, and also obtain, for example, inclination, orientation, temperature, humidity, illuminance, and so forth from the various detections signals from the other sensors 69. Note that the sensor control signal processing unit 67 also includes an acceleration sensor driver for controlling the acceleration operation of the acceleration sensor 68, and drivers for controlling the detection operations of the other sensors 69.

A touch panel 73 is disposed in the panel front surface of the display panel 61, and also has a size covering generally the entire display panel surface. This touch panel 73 has a configuration wherein multiple transparent electrode patterns are arrayed in the X-Y direction on the panel surface made up of transparent sensor glass, and is a device capable of detecting that an external conductor such as the user's finger comes into contact with the panel surface, detecting approaching before the external conductor before coming into contact with the panel surface, and outputting the X-Y coordinate position information on the panel surface at the time of the external conductor coming into contact with or coming closer to the panel surface.

A touch panel control signal processing unit 72 controls the operation and scanning of the touch panel 73, and also performs determination whether or not the external conductor comes into contact with or comes closer to the touch panel 73, calculation of a contact position or approaching position, calculation of how much distance the external conductor has come closer to the panel surface at the time of proximity, calculation of duration time of a contact or close state, a time interval wherein contact or proximity has been detected, the movement direction, movement speed, movement locus, and so forth of the external conductor or the like in a contact or close state, based on capacitance values detected by the touch panel 25 and X-Y coordinate position information detected by the touch panel 25. The touch panel control signal processing unit 72 then transmits the data obtained by these detection, computation, calculation, and so forth to the control/computing unit 52. Note that the touch panel control signal processing unit 72 also includes a touch panel driver for controlling the operation and scanning of the touch panel 73.

The memory unit 53 is made up of built-in memory provided to the inside of this terminal, and detachable card-shaped memory. Examples of the detachable card-shaped memory include a card in which so-called SIM (Subscriber Identity Module) information or the like is stored. The built-in memory is made up of ROM (Read Only Memory) and RAM (Random Access Memory). The ROM stores an OS (Operating System), a control program for the control/computing unit 52 controlling the units, various initial set values, dictionary data, letter prediction conversion dictionary data, various types of audio data, and also various programs including a text editor, an HTML editor, a mailer, an image editor, the application programs and operation control program according to the present embodiment, and so forth. This ROM includes rewritable ROM such as NAND-type flash memory or EEPROM (Electrically Erasable Programmable Read-Only Memory), and is configured so as to save e-mail data, the data of a phone book or mail address book, the data of still image or moving image content, and additionally various user set values, and so forth. The RAM stores data as a work area or buffer area as appropriate when the control/computing unit 52 performs various types of data processing.

The control/computing unit 52 is made up of a CPU (Central Processing Unit), controls the units such as the communication unit 51, video signal processing unit 60, audio signal processing unit 64, GPS module 54, noncontact communication module 57, short-distance wireless communication module 55, digital broadcast reception module 56, external memory interface unit 58, camera unit 63, sensor control signal processing unit 67, external input/output terminal unit 70, key operating unit 71, touch panel control signal processing unit 72, and so forth, and performs various calculations as appropriate. Also, the control unit/computing unit 52 executes the control program stored in the memory unit 53, the text editor, HTML editor, mailer, image editor, and the application programs and operation control program according to the present embodiment. Also, with the present embodiment, the control/computing unit 52 executes the operation control program according to the present embodiment, thereby performing predetermined processing such as suspending processing based on the proximity detection of an external object using the touch panel 73 which will be described later. Note that description will be made later regarding the flow of control and so forth at the time of the control/computing unit 52 executing the application programs and operation control program according to the present embodiment to perform predetermined processing such as suspending processing based on the proximity detection, or the like.

Additionally, the personal digital assistant according to the present embodiment naturally includes various components provided to a common personal digital assistant, such as a clock unit for measuring time and point-in-time, a battery for supplying power to the units, a power management IC for controlling power thereof, and so forth.

[Description of Proximity Detection Function at Touch Panel]

Figure 2:
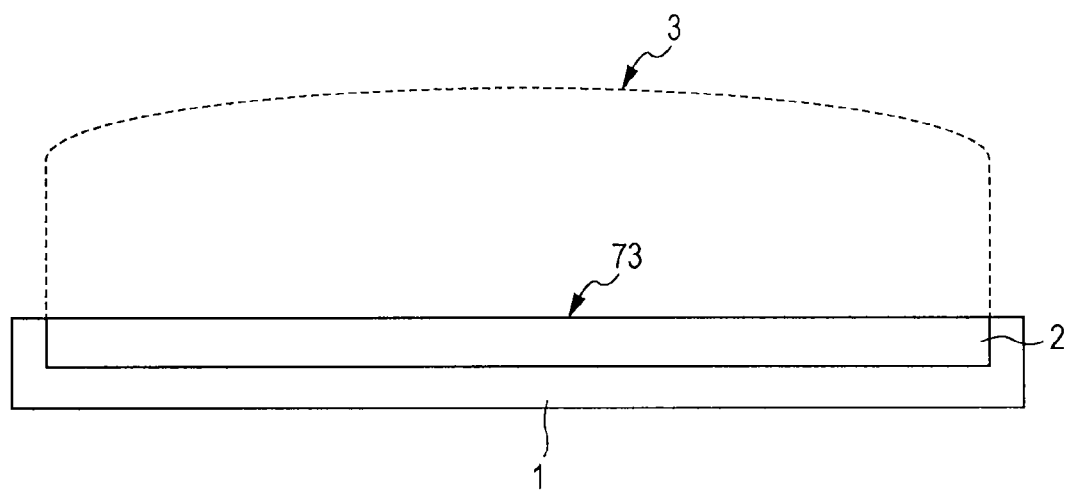
FIG. 2 is a schematic view schematically illustrating an area where the touch panel can detect change in capacitance in a state viewing the personal digital assistant according to the present embodiment from the side face.

FIG. 2 illustrates a schematic viewing a personal digital assistant 1 according to the present embodiment from the side face. As shown in FIG. 2, the personal digital assistant 1 according to the present embodiment includes a display panel 2, and further at the front face of this display panel 2, includes the touch panel 73 shown in FIG. 1 having a size generally covering the display screen thereof. Note that an area 3 shown in a dotted line in FIG. 2 represents an area where the touch panel 73 can detect change in capacitance. Also, though illustration thereof is omitted in FIG. 2, the personal digital assistant 1 according to the present embodiment includes the acceleration sensor 68 shown in FIG. 1 within a casing thereof.

Figure 3:
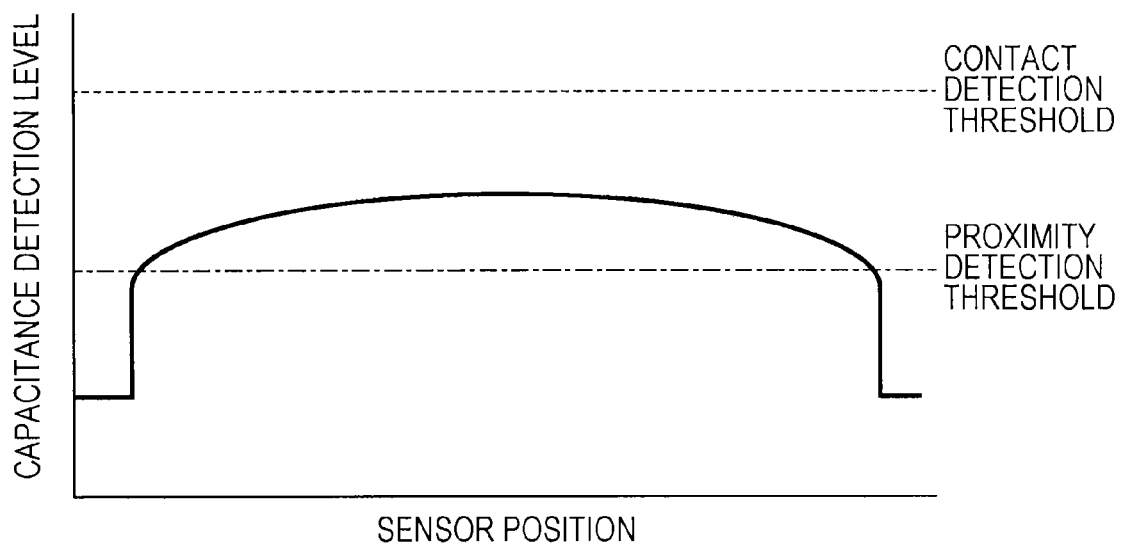
FIG. 3 is a diagram representing a relation between an capacitance detection level and a sensor position on the touch panel at the touch panel and a touch panel control signal processing unit which the personal digital assistant according to the present embodiment includes.
Figure 4:
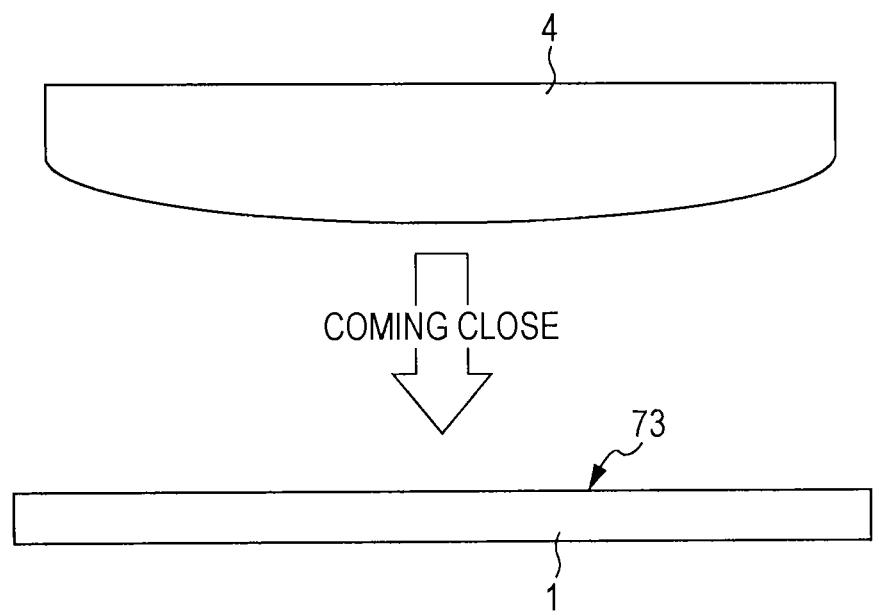
FIG. 4 is a schematic view illustrating the personal digital assistant according to the present embodiment as viewed from the side face, and also a state in which an external object (large object) which is large on some level such as a person's face or the like coming closer to the panel surface of the touch panel of this terminal.

FIG. 3 represents a relation between a capacitance detection level and a sensor position on the touch panel at the touch panel 73 and a touch panel control signal processing unit 72 which the personal digital assistant 1 according to the present embodiment includes. Further, FIG. 4 schematically illustrates the personal digital assistant 1 according to the present embodiment as viewed from the side face, and also a state in which an external object 4 having a certain level of large size, for example, such as a person's face or the like is coming closer to the panel surface of the touch panel 73 of this terminal 1.

Here, the touch panel 73 and touch panel control signal processing unit 72 which the personal digital assistant 1 according to the present embodiment includes are configured so as to perform detection determination using at least two thresholds of a contact detection threshold indicated in a dotted line in FIG. 3 that can detect that an external object having a size small on some level, for example, such as a person's finger or the like comes into contact with the panel surface of the touch panel 73, and a proximity detection threshold indicated in a dashed-dotted line in FIG. 3 that can detect a state in which the external object 4 having a size large on some level, for example, such as a person's face or the like comes closer to the panel surface of the touch panel 73. Note that, with the following description, a small external object such as a person's finger or the like that connects the touch panel 73 will be referred to as "small object", and the large external object 4 such as a person's face or the like that comes closer to the touch panel 73 will be referred to as "large object 4".

Specifically, when the square measure of at least one area where change in capacitance has been detected at the touch panel 73 is a square measure equal to or wider than a predetermined extent serving as for detection of a large object, and also a capacitance detection level in the area thereof is equal to or greater than the proximity detection threshold but less than the contact detection threshold, the personal digital assistant 1 according to the present embodiment can detect that the large object 4 such as a person's face or the like has come closer to on the panel surface of the touch panel 73. More specifically, for example as shown in FIG. 4, in the event that the capacitance detection level become equal to or greater than the proximity detection threshold shown in a dashed-dotted line in FIG. 3, and also less than the contact detection threshold shown in a dotted line in FIG. 3 by this large object 4 such as a person's face or the like shown in a solid line in FIG. 3 gradually coming closer to the touch panel 73, the personal digital assistant 1 according to the present embodiment can detect that the large object 4 is in a state approaching the touch panel 73. Also, in the event that proximity of the large object 4 has been detected, the personal digital assistant 1 according to the present embodiment can temporarily suspend the contact detection function at the touch panel 73. Thus, for example, even in the event that the large object 4 comes into contact with on the panel surface of the touch panel 73, and the capacitance detection level becomes equal to or greater than the contact detection threshold, the personal digital assistant 1 according to the present embodiment does not erroneously take in the contact coordinates of this large object 4 as the detected coordinate. Note that, though details will be described later, when proximity of the large object 4 is detected, the personal digital assistant 1 according to the present embodiment may reduce power consumption while increasing noise resistance (signal/noise ratio) by decreasing the scan cycle at the touch panel 73 as compared to normal times.

On the other hand, when the square measure of each of one or more areas where change in capacitance has been detected at the touch panel 73 does not exceed a predetermined extent used for detection of a large object, and also the capacitance level at each area is equal to or greater than the proximity detection threshold but less than the contact detection threshold, the personal digital assistant 1 according to the present embodiment detects that a small object such as a person's finger or the like comes closer to the panel surface of the touch panel 73. In this case, unlike at the time of proximity of the large object 4 being detected, the personal digital assistant 1 according to the present embodiment does not perform temporal suspending processing of the contact detection function at the touch panel 73. Thus, in the event that the capacitance detection level due to this small object become equal to or greater than the contact detection threshold, the personal digital assistant 1 according to the present embodiment can detect that the small object such as a person's finger or the like comes into contact on the panel surface of the touch panel 73.

[Description of Suspending Processing Based on Proximity Detection]

Also, the personal digital assistant 1 according to the present embodiment includes, in addition to the phone call application program for performing an audio phone call, various application programs, for example, such as an e-mail application program for performing creation of an e-mail, and an outgoing/incoming call, a Web application program for performing connection to a Web, and display of a Web screen thereof, and so forth, a camera application program for performing camera photography, and an electronic wallet application program for handling an electronic wallet.

Of the multiple application programs that the personal digital assistant 1 according to the present embodiment includes, for example, the phone call application program is a program whereby, in addition to outgoing/incoming call processing at the time of an audio phone call, and the actual audio phone call processing, other processing relating to this audio phone call can be executed. Also, the phone call application program also includes a program that executes processing for suspending the display panel and touch panel at the time of execution of an audio phone call as one program for executing other processing relating to the audio phone call.

Specifically, after receiving the incoming audio phone call, when the user moves this personal digital assistant 1 to his/her ear for example to perform a phone call, and thus, the posture of this terminal within real space becomes a generally erected state, and also has come closer to the large object 4 such as the user's head or the like, the phone call application program according to the present embodiment can execute processing for suspending the display panel and touch panel.

Such a suspending function of the display panel and touch panel prevents a situation wherein when the user applies this personal digital assistant 1 to his/her ear at the time of a phone call, this ear or the user's cheek or the like comes into contact with the touch panel, contact coordinate values thereof are erroneously detected as the coordinate values of operation input by the user, and is also prepared to reduce power consumption owing to the backlight of the display panel being turned off.

Description will be made below regarding a display transition example on the display panel at the time of the personal digital assistant 1 according to the present embodiment suspending the display panel and touch panel while the phone call application program is executed, with reference to FIG. 5 through FIG. 12.

Figure 5:
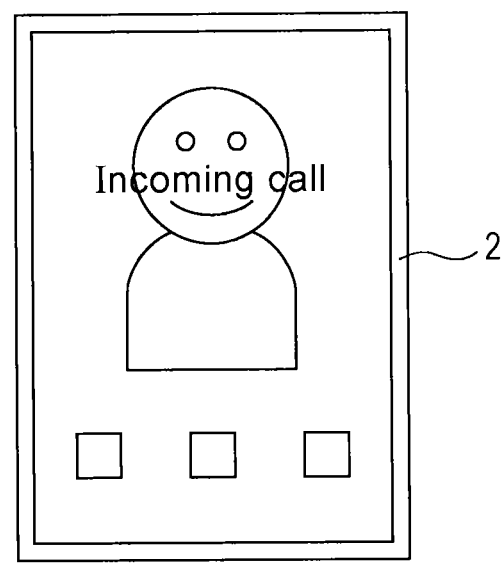
FIG. 5 is a diagram illustrating a screen example of a display panel on which incoming destination information and so forth are displayed by execution of a phone call application program in the event that the personal digital assistant according to the present embodiment has received an audio incoming call.

Upon receiving incoming of an audio phone call, the personal digital assistant 1 according to the present embodiment displays information relating to the incoming caller thereof on the screen of the display panel 2 by execution of the phone call application program, for example, as shown in FIG. 5.

Figure 6:
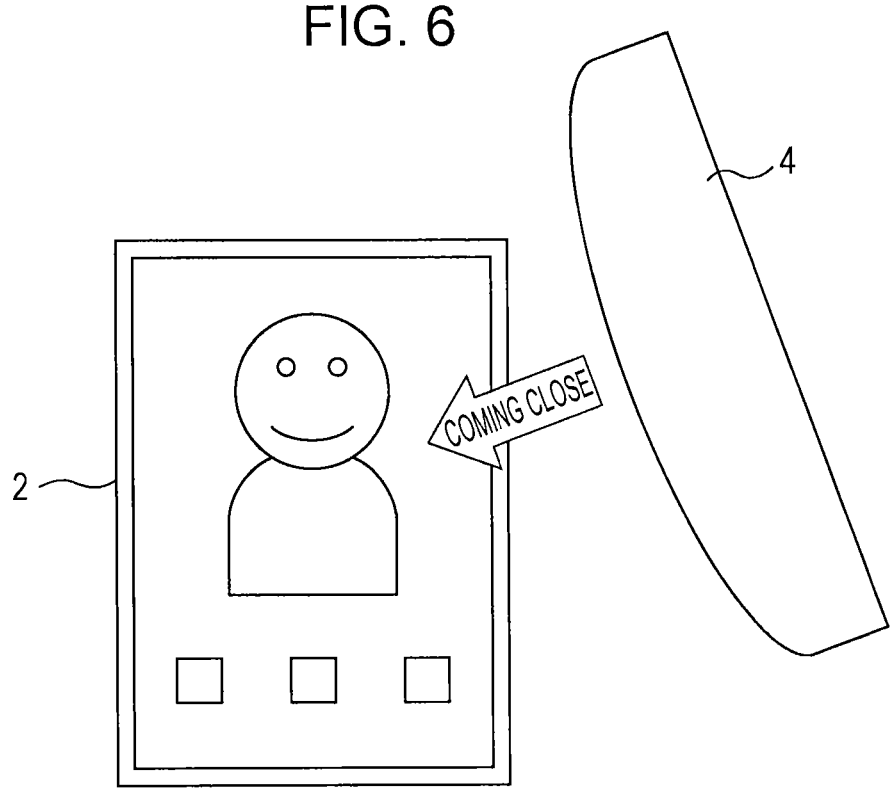
FIG. 6 is a diagram illustrating a state in which a large object such as a user's face or the like is coming closer to the touch panel of the personal digital assistant according to the present embodiment.
Figure 7:
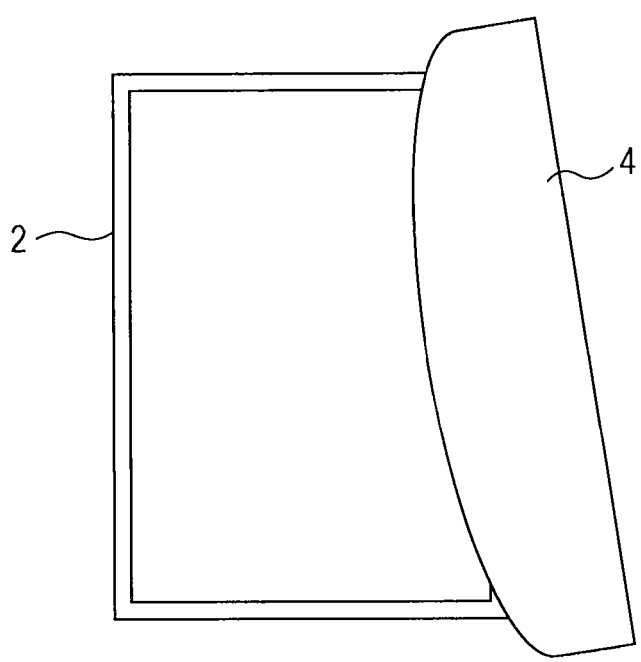
FIG. 7 is a diagram illustrating a display state example of the display panel suspended for detection of a large object such as a user's face or the like coming closer to the touch panel of the personal digital assistant according to the present embodiment.

Here, upon detecting from the acceleration information of the acceleration sensor 68 that this terminal 1 is moved to the user's ear and become a generally erected state within real space, the personal digital assistant 1 according to the present embodiment enables the touch panel 73 to perform contact detection and proximity detection as described above. Then, as shown in FIG. 6, for example, upon detecting that the large object 4 such as the user's face or the like has come closer to the touch panel 73, the personal digital assistant 1 according to the present embodiment executes suspending processing such that the contact detection function is temporarily suspended regarding the touch panel 73, and also, with regard to the display panel 2, executes suspending processing so as to turn off the backlight thereof as shown in FIG. 7.

Figure 8:
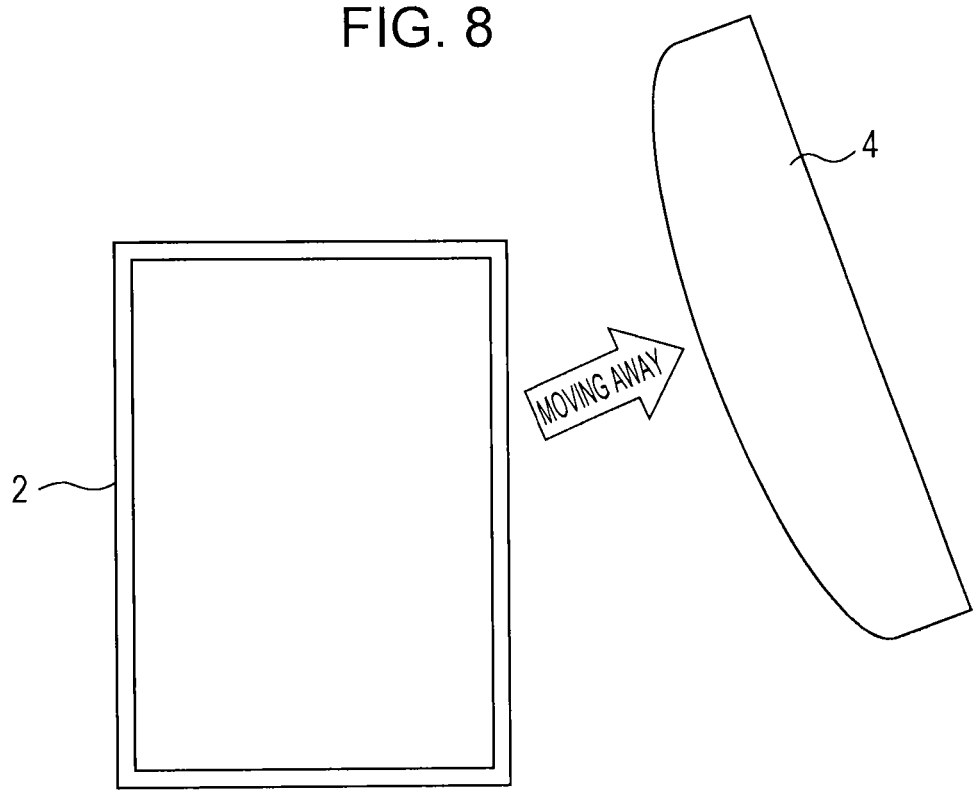
FIG. 8 is a diagram illustrating a state in which a large object such as a user's face or the like is moving away from the touch panel of the personal digital assistant according to the present embodiment.

Also, in the event that the suspending processing is being executed, for example, when detecting from the acceleration information of the acceleration sensor 68 that this terminal 1 is in a state different from the generally erected state, or when detecting from change in the capacitance detection level of the touch panel 73 that the large object 4 such as the user's head or the like has moved away from this terminal 1 as shown in FIG. 8, the personal digital assistant 1 according to the present embodiment executes processing for releasing suspension of the display panel 2 and touch panel 73.

Figure 9:
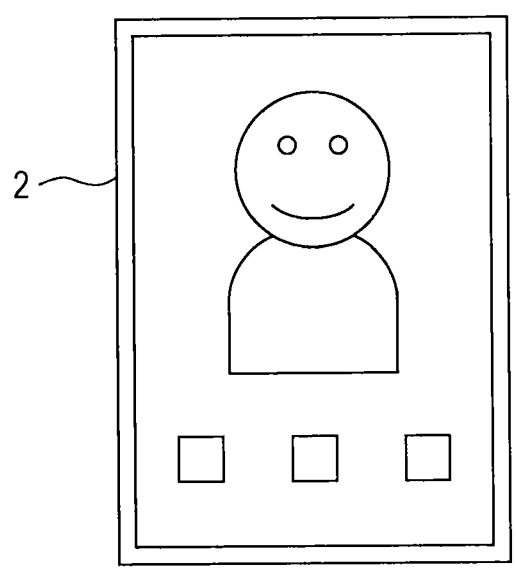
FIG. 9 is a diagram illustrating a display state example of the display panel restored for a large object such as a user's face or the like moving away from the touch panel of the personal digital assistant according to the present embodiment.

Then, upon executing the processing for releasing the suspension, the personal digital assistant 1 according to the present embodiment changes the touch panel 73 to a state in which contact detection or the like can be performed such as normal activation time, and also returns the screen display of the display panel 2 to a state in which information relating to the incoming caller, and so forth at the time of the incoming call is displayed as shown in FIG. 9.

[Software Structure for Executing Suspending Processing Base on Proximity Detection]

Figure 10:
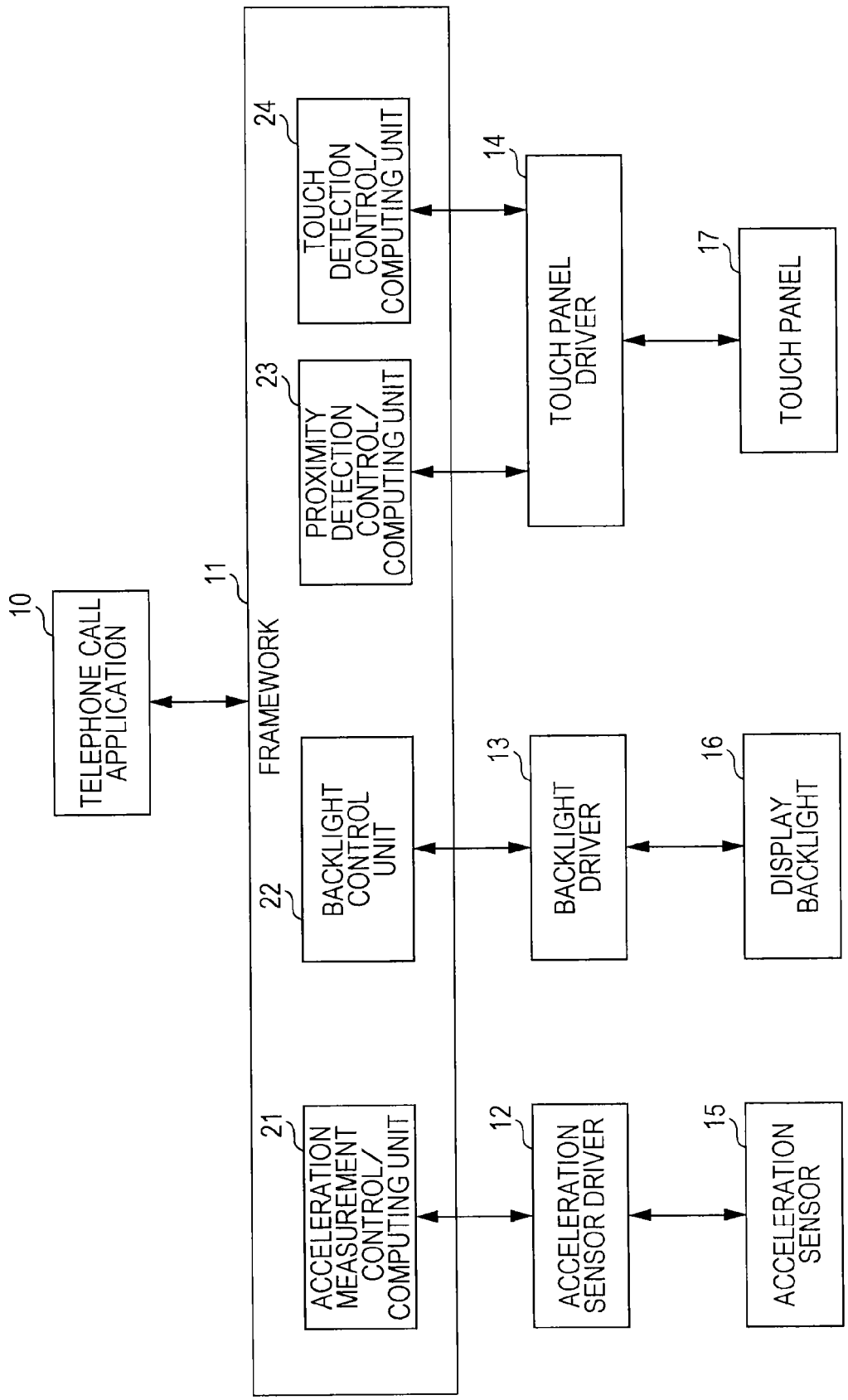
FIG. 10 is a schematic software structure diagram at the time of realizing processing for the phone call application program suspending the display panel and touch panel based on an acceleration sensor detection signal and a proximity detection signal of the touch panel with the personal digital assistant according to the present embodiment.

FIG. 10 illustrates a schematic software structure diagram at the time of the phone call application program 10 realizing processing for suspending the display panel and touch panel, and so forth based on the detection signal according to the acceleration sensor, and the proximity detection signal according to the touch panel at the time of an audio phone call with the personal digital assistant 1 according to the present embodiment. Note that, with the software structure diagram shown in FIG. 10, for convenience of description, the hardware configurations of the touch panel 17 (touch panel 73 in FIG. 1), acceleration sensor 15 (acceleration sensor 68 in FIG. 1), and the backlight 16 of the display panel are also drawn.

In FIG. 10, the touch panel 17 has, as described above, a configuration wherein multiple transparent electrode patterns are arrayed in the X-Y direction on the panel surface made up of transparent sensor glass.

The touch panel driver 14 is driver software for performing control of the operation and scanning of the touch panel 17. This touch panel driver 14 detects the capacitance values of the transparent electrode patterns by scanning the transparent electrode patterns in the X direction and Y direction of the touch panel 17 respectively, and outputs the coordinate values of the transparent electrode patterns and the capacitance detection values thereof to a later-described framework 11.

The acceleration sensor 15 detects, as described above, when the personal digital assistant 1 according to the present embodiment moves, for example, within real space.

The acceleration sensor driver 12 is driver software for controlling detection of the operation and acceleration of the acceleration sensor 15. When acceleration is detected at the acceleration sensor 15, this acceleration sensor driver 12 outputs the acceleration detection value thereof to a later-described framework 11.

The display backlight 16 is the backlight of the display panel 61.

The backlight driver 13 is driver software for controlling on/off and brightness at the time of the display backlight 16 being on. This backlight driver 13 controls on/off and brightness at the time of the display backlight 16 being on under the control from a later-described framework 11.

The framework 11 is configured of a proximity detection control/computing unit 23, an acceleration measurement control/computing unit 21, a backlight control unit 22, and a touch detection control/computing unit 24 as a software structure for executing setting of the proximity detection threshold and contact detection threshold of the touch panel 17, discrimination between the small object and the large object, processing according to the result of discrimination between the small object and the large object, suspending processing at the time of detection of the large object, and so forth based on the detection signals of the acceleration sensor 15 and touch panel 17. Note that the proximity detection control/computing unit 23, acceleration measurement control/computing unit 21, backlight control unit 22, and touch detection control/computing unit 24 of this framework 11 may be formed of an OS (Operating System), or may be formed of the application programs, for example, such as the phone call application program. The phone call application program can cooperate with these frameworks. Also, the functions of the framework 11 may be implemented in the touch panel signal processing unit 72, sensor control signal processing unit 67, backlight control unit 62, and so forth in FIG. 1, or may be included in the control/computing unit 52.

The acceleration measurement control/computing unit 21 controls the operation of the acceleration sensor 15 equipped to this personal digital assistant 1 through the acceleration sensor driver 12. Also, the acceleration measurement control/computing unit 21 can compute acceleration applied to this personal digital assistant 1 based on the acceleration detection value from the acceleration sensor 15 supplied via the acceleration sensor driver 12, and also based on the computed acceleration value, determine whether or not this personal digital assistant 1 is changed to a posture state close to generally vertical within real space.

The proximity detection control/computing unit 23 and touch detection control/computing unit 24 control the operation of the touch panel 17 equipped to this personal digital assistant 1 through the touch panel driver 14. Specifically, when the capacitance values and coordinate values of the transparent electrode patterns of the touch panel 17 were supplied, based on these information the touch detection control/computing unit 24 determines what kind of input operation the user performed as to the touch panel 17. Also, with the present embodiment, when determining at the acceleration measurement control/computing unit 21 that this personal digital assistant 1 is in a state close to generally vertical within real space, the touch detection control/computing unit 24 obtains, based on the capacitance value supplied from the touch panel 17 via the touch panel driver 14, the size and so forth of an area where this capacitance changed, and further executes discrimination processing between the small object and the large object from the size of the area thereof. Also, with the present embodiment, when determining at the acceleration measurement control/computing unit 21 that this personal digital assistant 1 is in a state close to generally vertical within real space, the proximity detection control/computing unit 23 executes, based on the capacitance value supplied from the touch panel 17 via the touch panel driver 14, proximity determination processing using the proximity detection threshold, and contact determination processing using the contact detection threshold.

With the framework 11 according to the present embodiment, when determining at the acceleration measurement control/computing unit 21 that this personal digital assistant 1 is in a state close to generally vertical within real space, and further when detecting proximity of the large object at the proximity detection control/computing unit 23, the touch detection control/computing unit 24 executes suspending processing for temporarily suspending the contact detection function at the touch panel 17 via the touch panel driver 14, and also the backlight control unit 22 executes suspending processing for turning off the display backlight 16 via the backlight driver 13.

[Flowchart of Suspending Processing Based on Proximity Detection]

Figure 11:
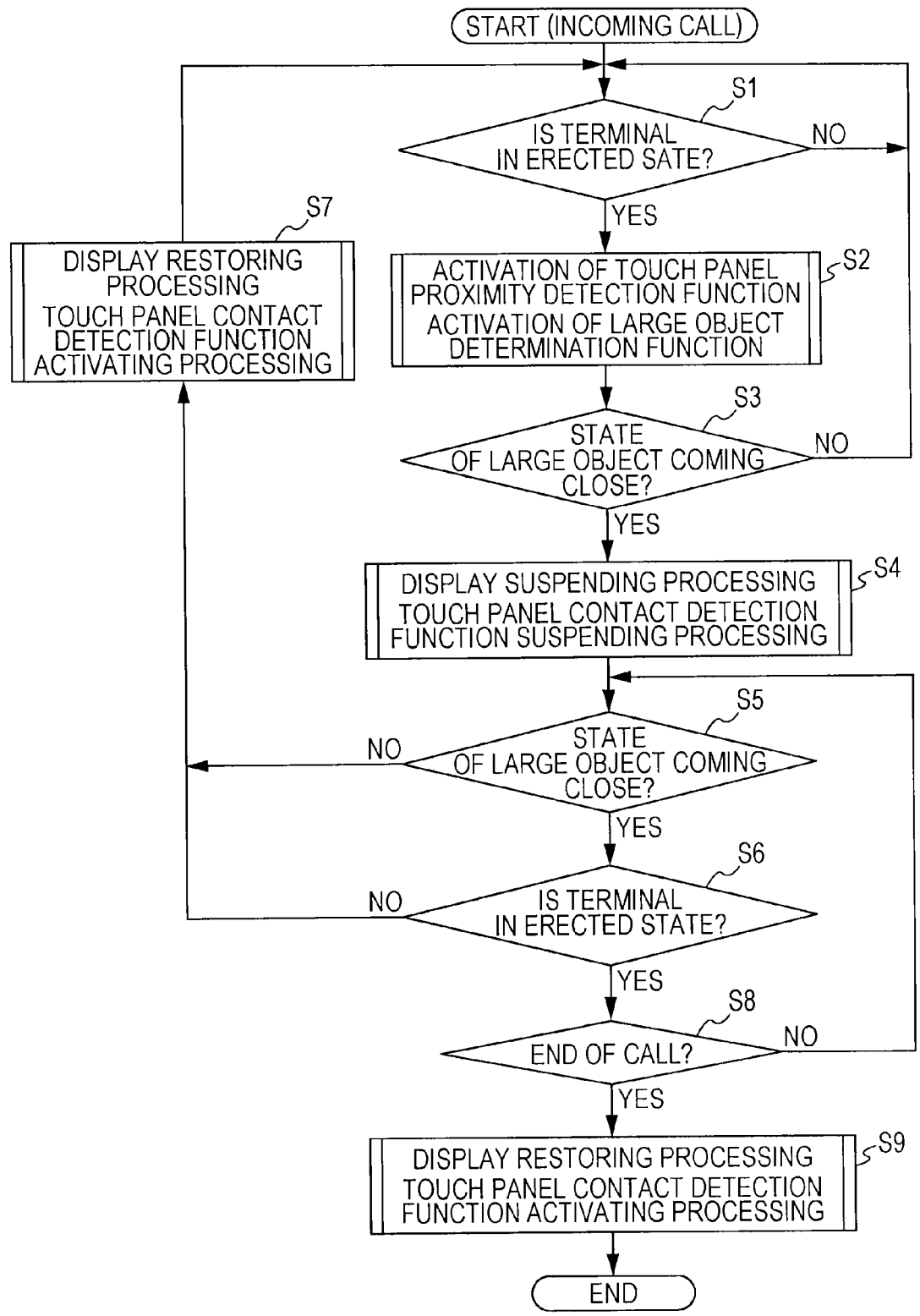
FIG. 11 is a schematic flowchart of the processing for the phone call application program suspending the display panel and touch panel based on an acceleration sensor detection signal and a proximity detection signal of the touch panel.

FIG. 11 illustrates a schematic flowchart of processing for the phone call application program 10 suspending, at the time of an audio phone call, the display panel and touch panel based on the detection signal from the acceleration sensor 15, and the proximity detection signal from the touch panel 17.panel 17.

In FIG. 11, for example, when there is an incoming call for an audio phone call, and instruction input to the effect that the user receives this incoming call (off-hook instruction input) is performed, the phone call application program 10 advances the processing to step S1.

Upon proceeding to the processing in step S1, the acceleration measurement control/computing unit 21 of the framework 11 determines, based on the acceleration detection value from the acceleration sensor 15 supplied via the acceleration sensor driver 12, whether or not this personal digital assistant 1 is in a state close to generally vertical within real space. Note that the acceleration measurement control/computing unit 21 returns the processing while this personal digital assistant 1 is not in a state close to generally vertical. When determining that this personal digital assistant 1 is in a state close to generally vertical, the phone call application program 10 advances the processing to step S2.

Upon proceeding to the processing in step S2, the touch detection control/computing unit 24 of the framework 11 activates the discrimination function between the large object and the small object, and also, the proximity detection control/computing unit 23 activates the proximity detection function of the large object.

Next, the proximity detection control/computing unit 23 determines as processing in step S3 whether or not the large object 4 such as the user's face or the like has come closer to the panel surface of the touch panel 17 by comparison between the capacitance detection value and the proximity detection threshold from the touch panel 17 supplied via the touch panel driver 14. When detecting proximity of the large object 4, the phone call application program advances the processing to step S4. Specifically, after determining at the acceleration measurement control/computing unit 21 that this personal digital assistant 1 is in a state close to generally vertical within real space, in the event of determining at the proximity detection control/computing unit 23 that the external object has come closer to this personal digital assistant, the processing is advanced to step S4. Note that, as long as the large object 4 does not come closer to this personal digital assistant 1, the phone call application program returns the processing to step S1.

Upon proceeding to the processing in step S4, the backlight control unit 22 of the framework 11 executes suspending processing for turning off the display backlight 16 through the backlight driver 13. Also, the touch detection control/computing unit 24 of the framework 11 executes suspending processing for temporarily suspending the contact detection function of the touch panel 17 through the touch panel driver 14. After this processing in step S4, the phone call application program advances the processing to step S5.

Upon proceeding to the processing in step S5, the proximity detection control/computing unit 23 of the framework 11 determines whether or not a state in which the large object 4 such as the user's face or the like has come closer to the touch panel 17 is maintained, by comparison between the capacitance value and the proximity detection threshold from the touch panel 17 supplied via the touch panel driver 14.

In the event that the proximity detection control/computing unit 23 determines in step S5 that the large object 4 is still not away from (is close to) the personal digital assistant 1, the phone call application program advances the processing to step S6.

Upon proceeding to the processing in step S6 after the proximity detection control/computing unit 23 determines in step S5 that the large object 4 is still not away from (is close to) the personal digital assistant 1, the acceleration control/computing unit 21 determines, based on the acceleration detection value supplied from the acceleration sensor 15 through the acceleration sensor driver 12, whether or not this personal digital assistant 1 maintains a state close to generally vertical.

In the event that the acceleration control/computing unit 21 determines in step S6 that this personal digital assistant 1 maintains a state close to generally vertical, the phone call application program advances the processing to step S8.

Also, in the event that the proximity detection control/computing unit 23 determines in step S5 that the large object 4 such as the user's face or the like is away from this personal digital assistant 1, the audio application program advances the processing to step S7.

In the event of proceeding to the processing in step S7 since the large object 4 is away from this personal digital assistant 1, the backlight control unit 22 of the framework 11 executes resuming processing for turning on the display backlight 16 through the backlight driver 13, and also, the touch detection control/computing unit 24 executes resuming processing for restoring the contact detection function according to the touch panel 17 through the touch panel driver 14.

Also, in the event that the acceleration control/computing unit 21 determines in step S6 that the personal digital assistant 1 is changed to another state from a state close to generally vertical, the phone call application program advances the processing to step S7.

In the event of proceeding to the processing in step S7 since the personal digital assistant 1 is changed to another state from a state close to generally vertical, the backlight control unit 22 of the framework 11 executes resuming processing for turning on the display backlight 16 through the backlight driver 13, and the touch detection control/computing unit 24 executes resuming processing for restoring the contact detection function according to the touch panel 17 through the touch panel driver 14.

After the processing in step S7, the phone call application program returns the processing to step S1.

Also, in the event of proceeding to the processing in step S8 after the acceleration control/computing unit 21 determines in step S6 that this personal digital assistant 1 maintains a state close to generally vertical, the phone call application program determines whether or not the audio phone call by the user is completed. Note that completion of the audio phone call can be determined by determining whether or not completion of the phone call has been performed by the other party of the call, or whether or not off-hook instruction input for terminating the phone call has been performed by the user of the personal digital assistant 1.

In the event that determination is made in step S8 that the audio phone call is completed, i.e., as processing in step S9 the backlight control unit 22 of the framework 11 executes resuming processing for turning on the display backlight 17 through the backlight driver 13, and also, the touch detection control/computing unit 24 executes resuming processing for restoring the contact detection function according to the touch panel 17 through the touch panel driver 14.

Thereafter, the audio application program ends the processing of the flowchart in FIG. 11.

[Schematic Processing Sequence at Time of Execution of Phone Call Application Program]

Figure 12:
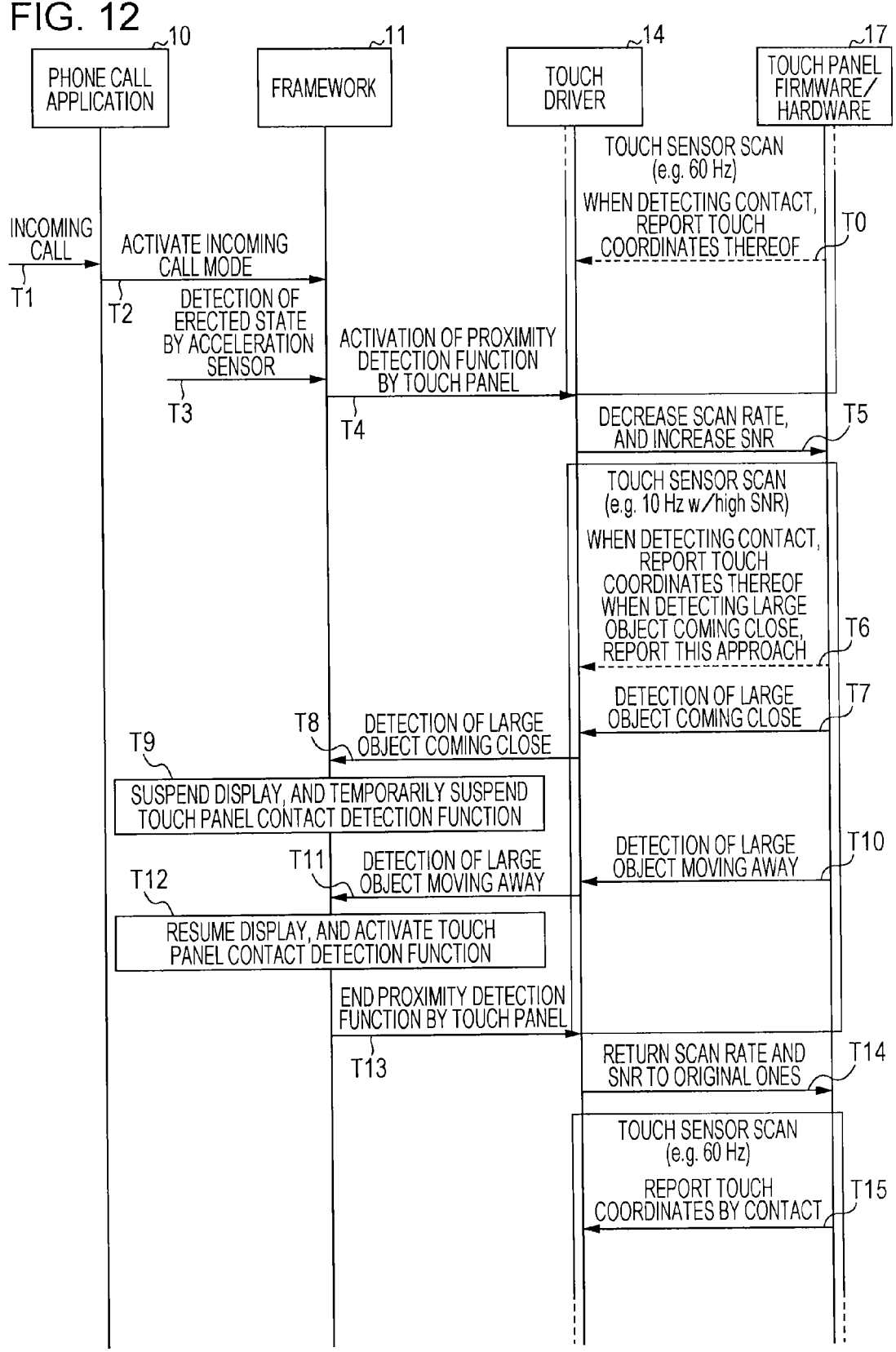
FIG. 12 is a schematic processing sequence chart of the phone call application program, framework, touch panel driver, and touch panel at the time of executing an audio phone call with the personal digital assistant according to the present embodiment.

FIG. 12 illustrates, with the software structure shown in FIG. 10 of the personal digital assistant 1 according to the present embodiment, a schematic processing sequence of the phone call application program 10, framework 11, touch panel driver 14, and touch panel 17 at the time of executing an audio phone call.

In FIG. 12, for example, there is an incoming call for an audio phone call (T1), upon instruction input to the effect that this incoming call is received (on-hook instruction input) being performed from the user, the phone call application program 10 proceeds to a phone incoming call mode (T2), and also displays an incoming call screen as shown in FIG. 5 on the display.

Upon proceeding to the phone incoming call mode by the phone call application program 10 (T2), the framework 11 confirms whether or not this personal digital assistant 1 is in a state close to generally vertical by the acceleration measurement control/computing unit 21 monitoring the detection signal of the acceleration sensor 15.

When this personal digital assistant 1 become a state close to generally vertical (T3), with the framework 11, the touch detection control/computing unit 24 and proximity detection control/computing unit 23 control the touch panel driver 14 to activate the above-described proximity detection function at the touch panel 17 (T4).

Also, at this time, the touch panel driver 14 decreases the scan rate at the touch panel 17, for example, from 60 Hz at normal time (T0) to 10 Hz under the control of the touch detection control/computing unit 24 (T5). Note that, with the present embodiment, such scan rate decreasing processing is performed for increasing noise resistance (signal/noise ratio) of the large object proximity detection at the time of an audio phone call, and on the other hand, for enabling reduction in power consumption due to decrease in the scan rate.

At the time of this state, for example, when detecting contact of the small object or the like at the touch panel 17, contact detection coordinates thereof are reported to the touch detection control/computing unit 24 through the touch panel driver 14, and on the other hand, for example, when the large object approaches, the proximity detection control/computing unit 23 detects this through the touch panel driver 14 (T6 through T8).

When detecting the proximity of the large object at the proximity detection control/computing unit 23, with the framework 11, the backlight control unit 22 controls the backlight driver 13 to turn off the display backlight 16, and also, the touch detection control/computing unit 24 controls the touch panel driver 14 to execute suspending processing such as temporarily suspension of the contact detection function of the touch panel 17 (T9).

Also, after execution of the suspending processing, when the large object has moved away from the touch panel 17, the proximity detection control/computing unit 23 detects this through the touch panel driver 14 (T10 through T11).

Upon detecting the large object having moved away at the proximity detection control/computing unit 23, with the framework 11, the backlight control unit 22 controls the backlight driver 13 to turn on the display backlight 16, and also, the touch detection control/computing unit 24 controls the touch panel driver 14 to execute resuming processing such as restoring and activating the contact detection function of the touch panel 17 (T12).

Thereafter, with the framework 11, the touch detection control/computing unit 24 ends the large object determination function, and the proximity detection control/computing unit 23 ends the large object proximity detection function (T13).

Further, the touch detection control/computing unit 24 returns the scan rate of the touch panel 17 under the control of the touch panel driver 14 from 10 Hz to 60 Hz at normal time (T14).

Thus, the touch panel 17 returns, when an external object has come into contact with on the panel surface thereof, operation for reporting contact detection coordinates thereof to the touch panel driver 14.

[Advantage of Present Embodiment at Time of Execution of Phone Call Application Program]

The present embodiment enables, at the time of execution of the phone call application program, proximity detection of the large object, for example, such as a person's face or the like using the touch panel for user operation input without using a proximity sensor in a conventional personal digital assistant. That is to say, according to the present embodiment, proximity of a person's face or the like can be detected in a sure manner, and predetermined processing such as suspending processing or the like can be executed without malfunction. Also, according to the present embodiment, the proximity sensor provided to a conventional system can be eliminated, and accordingly, physical space occupied by this proximity sensor can be eliminated on the device layout, and further, reduction in costs owing to elimination of the proximity sensor can be realized. Further, according to the present embodiment, in the event of eliminating the proximity sensor, available space can additionally be increased on the terminal casing.

[Processing Example Using Electronic Wallet Application Program]

With the above embodiment, execution of the phone call application has been introduced as an example, but the claimed invention is not restricted to the application program thereof, and can be applied to execution of other application programs.

As an example of the other application programs, proximity detection of the large object at the time of execution of the electronic wallet application program, display suspension or display processing or the like according to the proximity detection thereof can be conceived. It goes without saying that this example is but an example, and that the claimed invention is not restricted to this.

Description will be made regarding large object proximity detection at the execution of the electronic wallet application program, and a display suspension or display processing example according to the proximity detection thereof, with reference to the following FIG. 13 through FIG. 18.

The following example will introduce processing wherein the personal digital assistant 1 according to the present embodiment executes the implemented electronic wallet application program to perform noncontact communication of information relating to electronic money as to a noncontact communication reader/writer through the noncontact communication module 57, and to perform, for example, electronic payment of a product or the like using the electronic money payment function of the noncontact communication reader/writer. Note that, as with this example, in the event that the noncontact communication module 57 is implemented in the personal digital assistant 1, the noncontact communication antenna of this noncontact communication module 57 is disposed, for example, on the rear face mutually corresponding to the casing face where the display is provided.

Figure 13:
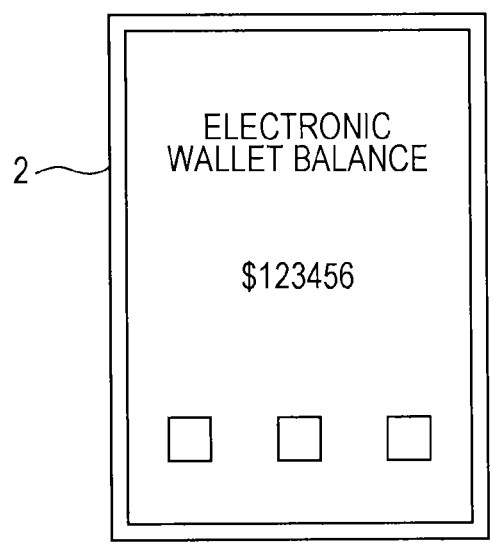
FIG. 13 is a diagram illustrating a screen example of the display panel where electronic wallet balance information or the like is displayed by the personal digital assistant according to the present embodiment executing an electronic wallet application program.

When executing the electronic wallet application program to perform electronic payment as to the noncontact communication reader/writer, the personal digital assistant 1 according to the present embodiment displays the current electronic money balance information on the screen of the display panel 2, for example, as shown in FIG. 13.

Figure 14:
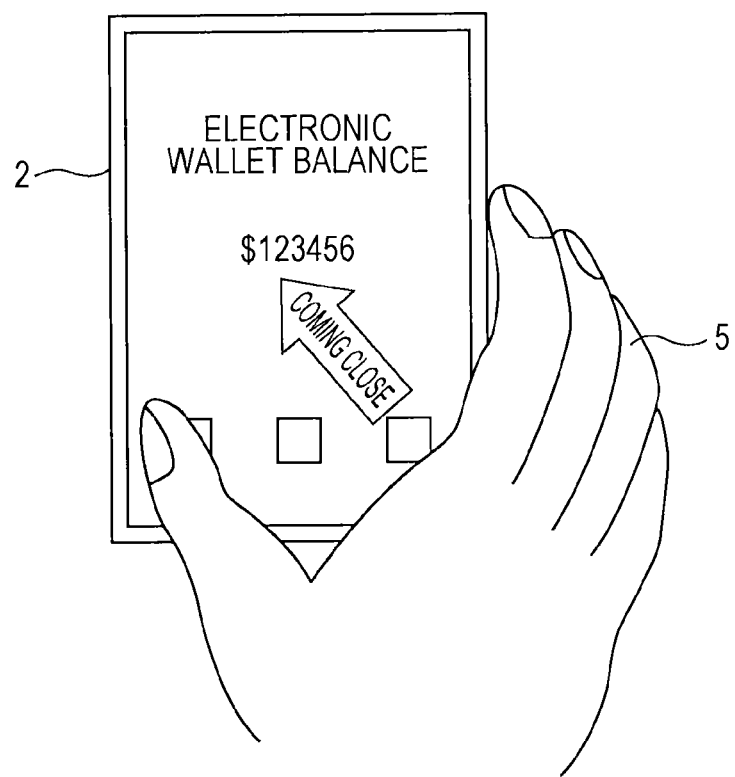
FIG. 14 is a diagram illustrating a state in which a large object such as a user's hand or the like is coming closer to the touch panel of the personal digital assistant according to the present embodiment.

Now, in the event that the user grasps the personal digital assistant 1 according to the present embodiment, and holds up this over the noncontact communication reader/writer to perform the electronic payment, the user grasps, for example as shown in FIG. 14, the personal digital assistant 1, for example, in a state with the touch panel 73 as the upper face by the hand (large object 5). Therefore, when the electronic payment is executed by the electronic wallet application program being activated, and the personal digital assistant 1 being held up over the noncontact communication reader/writer, the personal digital assistant 1 detects that the large object 5 such as the user's hand or the like has come closer to the touch panel 73. That is to say, the personal digital assistant 1 at this time detects proximity of the large object 5 such as the user's hand or the like.

Then, as shown in FIG. 14, for example, when detecting that the large object 5 such as the user's hand or the like has come closer to the touch panel 73, the personal digital assistant 1 according to the present embodiment executes suspending processing such as temporarily suspending the contact detection function regarding the touch panel 73.

Figure 15:
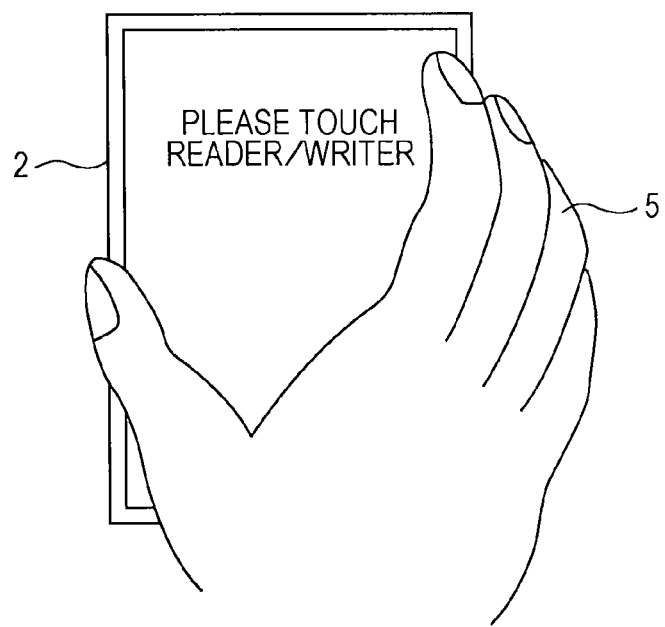
FIG. 15 is a diagram illustrating a display state example of the display panel of which the display has been switched due to detection of a large object such as a person's hand or the like coming closer to the touch panel of the personal digital assistant according to the present embodiment.

Also, the personal digital assistant 1 according to the present embodiment may execute suspending processing for turning off the backlight regarding the display panel 2 in the same way as described above, or may execute processing for obscuring display on the screen by decreasing the brightness of the backlight, or processing for displaying a message or the like as shown in FIG. 15 on the screen instead of display of personal information, for example. Specifically, in the event that the user performs an action of holding this personal digital assistant 1 so as to be held over the noncontact communication reader/writer, there is a possibility that information displayed on the display panel 2 will be viewed from others, and accordingly, it is undesirable that personal information such as the balance information is displayed so as to be viewed from others on the display screen. Therefore, at the time of performing an action of holding up over the noncontact communication reader/writer, the personal digital assistant 1 according to the present embodiment makes the display of the personal information displayed on the display 2 invisible or obscure. Also, in the event of performing electronic payment at the personal digital assistant 1, the user has to hold up over the noncontact communication reader/writer, and accordingly, it is conceivably important to inform this to the user. Therefore, at the time of performing an action of holding up over the noncontact communication reader/writer, the personal digital assistant 1 according to the present embodiment enables a message, indicating an action that the user has to perform, on the screen of the display 2 to be displayed. Note that, in the event of displaying the message or the like on the display screen, the personal digital assistant 1 according to the present embodiment may also display the message on a portion uncovered by the large object 5 such as the user's hand or the like on this display screen, whereby the message thereof can be viewed by the user.

Also, the personal digital assistant 1 according to the present embodiment executes suspending processing of the touch panel 73, message display switching or suspending processing of the display, and further, after this personal digital assistant 1 is moved over real space and the posture thereof is set to a generally horizontal state, in the event that the noncontact communication module 57 proceeds to a state noncontact-communicable with the noncontact communication reader/writer, executes the electronic payment processing.

Figure 16:
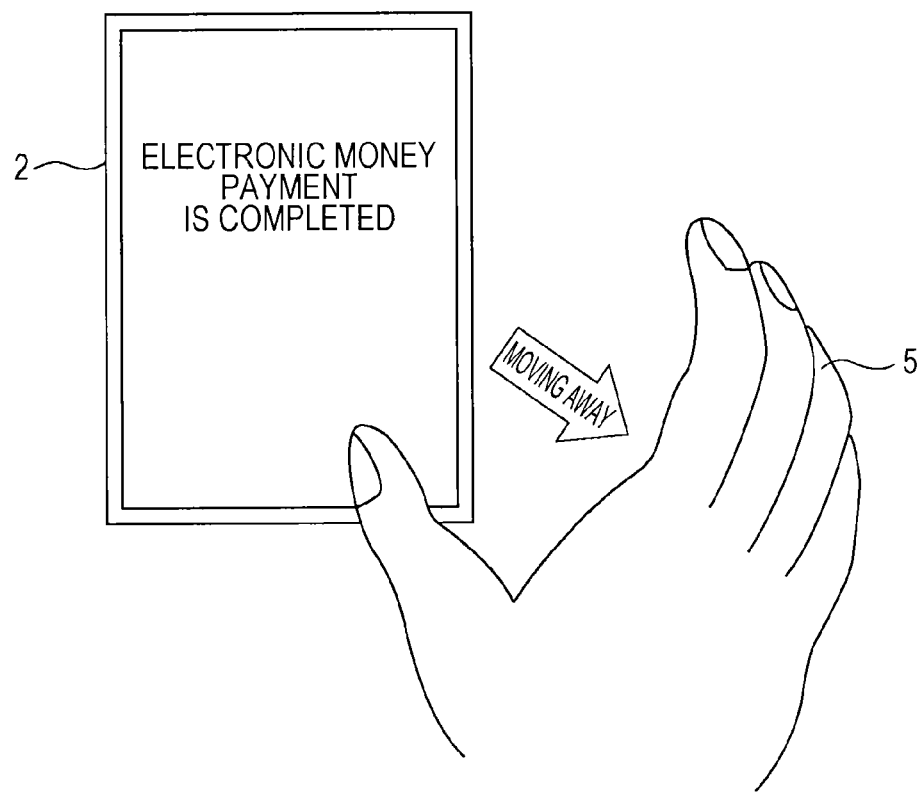
FIG. 16 is a diagram illustrating a state in which a large object such as a person's hand or the like moving away from the touch panel after electronic payment is completed at the personal digital assistant according to the present embodiment.
Figure 17:
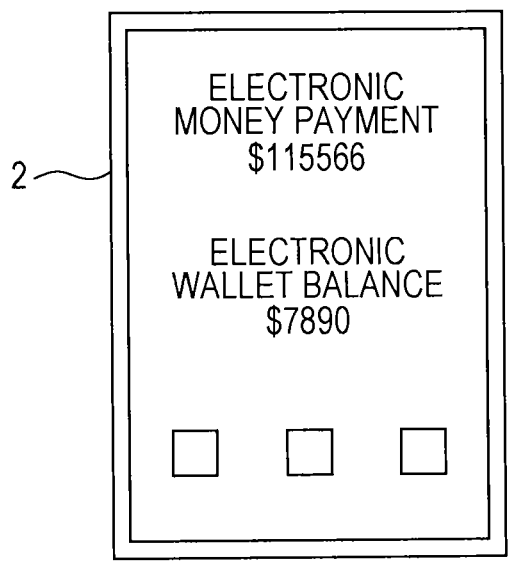
FIG. 17 is a diagram illustrating a display state example of the display panel restored due to a large object such as a person's hand or the like moving away from the touch panel of the personal digital assistant according to the present embodiment.

Then, upon the electronic payment processing being completed, the personal digital assistant 1 according to the present embodiment displays a message indicating completion of the electronic payment on the screen of the display panel 2, for example, as shown in FIG. 16, and also, upon this personal digital assistant 1 being moved over real space, or the large object 5 such as the user's hand or the like having moved away, releases the suspending processing of the touch panel 73, and then executes, for example as shown in FIG. 17, processing for displaying the amount of payment according to the electronic payment, electronic wallet balance information, and so forth.

Then, the personal digital assistant 1 according to the present embodiment changes the contact detection function at the time of normal operation to an active state regarding the touch panel 73, and also returns the screen display of the display panel 2 to, for example, the display state of a normal home screen.

[Software Structure for Executing Processing Based on Proximity Detection in Electronic Wallet Application]

Figure 18:
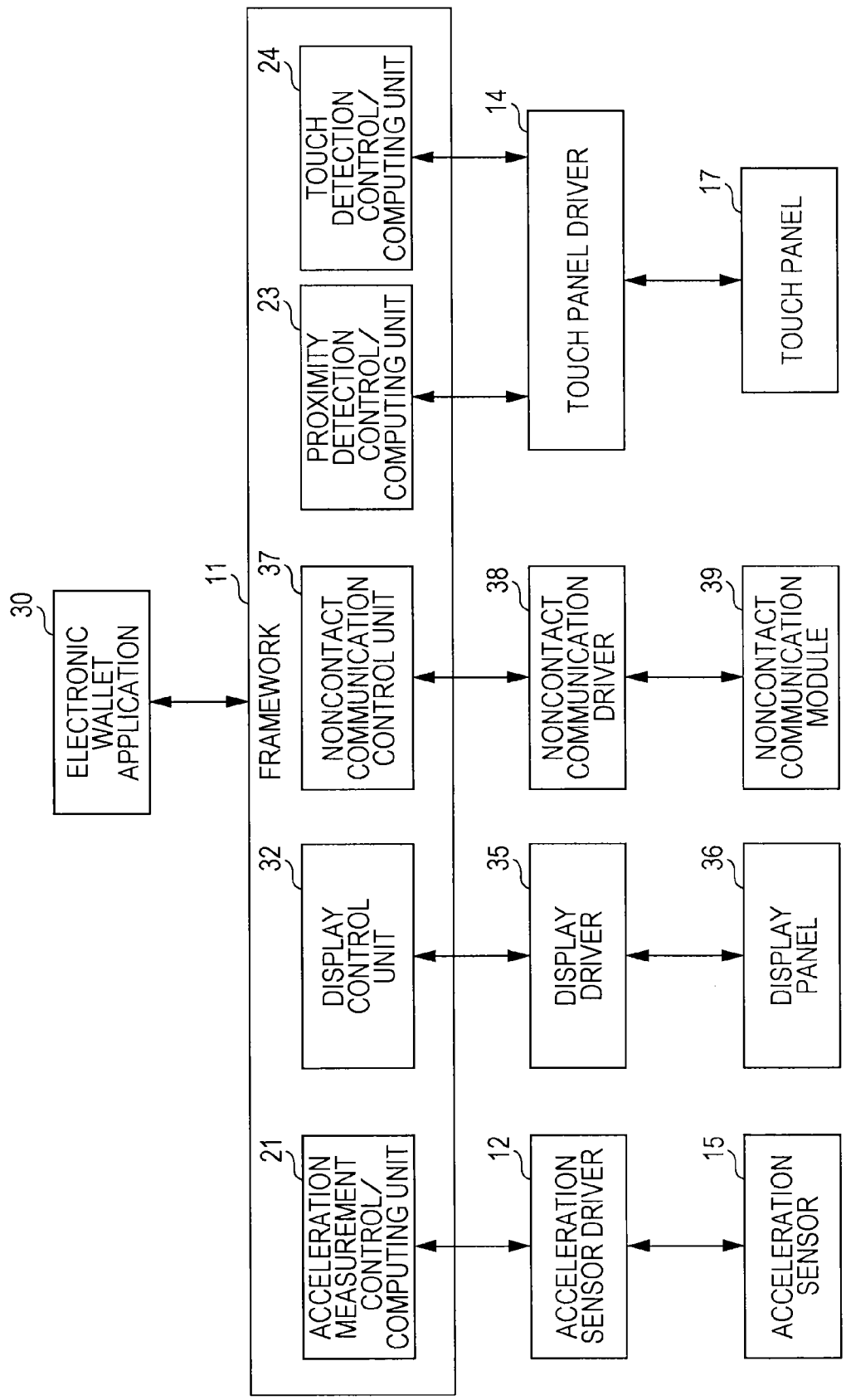
FIG. 18 is a schematic software structure diagram at the time of realizing processing for the electronic wallet application program suspending the touch panel, and switching display indication based on a proximity detection signal of the touch panel with the personal digital assistant according to the present embodiment.

FIG. 18 illustrates a schematic software structure diagram at the time of realizing processing wherein, with the personal digital assistant 1 according to the present embodiment, as described above, based on the proximity detection signal according to the touch panel, the electronic wallet application program 30 suspends the touch panel, and also switches, for example, the display image on the display. Note that, with the software structure diagram shown in FIG. 18, for convenience of description, the hardware configurations of the touch panel 17 (touch panel 73 in FIG. 1), acceleration sensor 15 (acceleration sensor 68 in FIG. 1), display panel 36 (display panel 61 in FIG. 1), and noncontact communication module 39 (noncontact communication module 57 in FIG. 1) are also drawn.

In FIG. 18, the touch panel 17 has the same configuration as described above, and the touch panel driver 14 is the driver software of this touch panel 17.

The acceleration sensor 15 detects acceleration in the same way as described above, and the acceleration driver 12 is the driver software of this acceleration sensor 15.

The display panel 36 is the display panel 61 in FIG. 1, and displays various types of information, messages, images, and so forth. The display driver 35 is driver software for driving the display panel 36, and also controlling display on the screen thereof. This display driver 35 controls the operation and display of the display panel 36 under control from the framework 11.

The noncontact communication module 39 is the above noncontact communication module 57 in FIG. 1, and made up of a noncontact communication antenna and peripheral circuits thereof.

The noncontact communication driver 38 is driver software for driving and controlling the noncontact communication module 39. This noncontact communication driver 38 controls the operation of the noncontact communication module 39 under control from the framework 11.

The framework 11 is configured of the proximity detection control/computing unit 23, acceleration measurement control/computing unit 21, and touch detection control/computing unit 24 in the same way as described above as a software structure for executing setting of the proximity detection threshold and contact detection threshold of the touch panel 17, discrimination between the small object and the large object, processing according to the result of discrimination between the small object and the large object, touch panel suspending processing at the time of detection of the large object, and so forth in the same way as described above, based on the detection signal of the touch panel 17. Also, in the case of the present embodiment, the framework 11 includes a display control unit 32 as a software structure for realizing, for example, display switching processing of the display panel 36, and includes a noncontact communication control unit 37 as a software structure for realizing noncontact communication processing via the noncontact communication module 39. Note that, with the example in FIG. 18, a structure for turning off the display backlight is omitted, but it goes without saying that the backlight may be turned off.

Note that the proximity detection control/computing unit 23, acceleration measurement control/computing unit 21, touch detection control/computing unit 24, display indication control unit 32, and noncontact communication control unit 37 of this framework 11 may be formed of an OS (Operating System), or may be formed of the application programs, for example, such as the electronic wallet application program. The electronic wallet application program can cooperate with these frameworks. Also, the functions of the framework 11 may be implemented in the touch panel signal processing unit 72, sensor control signal processing unit 67, video signal processing unit 60, and so forth in FIG. 1, or may be included in the control/computing unit 52.

The acceleration measurement control/computing unit 21 can control the operation of the acceleration sensor 15 through the acceleration sensor driver 12, compute acceleration applied to this personal digital assistant 1 based on the acceleration detection value from the acceleration sensor 15, and determine whether or not this personal digital assistant 1 has been, for example, moved within real space, and become a state close to generally horizontal.

The proximity detection control/computing unit 23 and touch detection control/computing unit 24 control, in the same way as described above, the operation of the touch panel 17 through the touch panel driver 14. Specifically, the touch detection control/computing unit 24 executes discrimination processing between the small object and the large object in the same way as described above based on the capacitance detection value of the touch panel 17. Also, the proximity detection control/computing unit 23 executes, in the same way as described above, the proximity determination processing based on comparison between the capacitance detection value and the proximity detection threshold supplied from the touch panel 17, and the contact determination processing based on comparison between the capacitance detection value and the contact detection threshold.

With the framework 11 according to the present embodiment, in the event that the proximity detection control/computing unit 23 detected the proximity of the large object, the touch detection control/computing unit 24 executes suspending processing for temporarily suspending the contact detection function at the touch panel 17 via the touch panel driver 14, and also, the display indication control unit 32 executes processing for switching the display of the display panel 36 to display such as a message as described above via the display driver 35, or the like.

Also, with the framework 11 according to the present embodiment, in the event that noncontact as to the noncontact communication reader/writer can be performed, through the noncontact communication module 39 and noncontact communication driver 38, the noncontact communication control unit 37 executes noncontact communication processing for electronic wallet payment processing or the like as described above.

[Advantage of Present Embodiment at Time of Electronic Wallet Application Program]

With the above embodiment, at the time of execution of the electronic wallet application program, the proximity of the large object 5, for example, such as a person's hand or the like can be detected by the touch panel for user operation input without using a proximity sensor as with a conventional personal digital assistant, whereby proximity such as a person's hand or the like can be detected in a sure manner while additionally increasing reduction in costs, and available space on the terminal casing by eliminating the necessity of a conventional proximity sensor, and further predetermined processing such as suspending processing, display switching processing, or the like can be executed without malfunction.

[Processing Example Using Camera Application Program]

Also, the touch panel suspending processing and the display panel suspending processing as described above can also be applied to execution of the camera application program, for example.

Description will briefly be made below regarding the large object proximity detection at the time of execution of the camera application program, and a display suspending processing example according to the proximity detection thereof.

For example, a digital camera including a large screen display panel whereby a preview image being imaged, a playback image, or the like can be displayed, and a so-called optical viewfinder or electronic viewfinder (hereafter, these will collectively be referred to as "viewfinder") has a problem wherein at the time of the user looking through the viewfinder, if the large screen display panel is lit, the viewfinder is obscured by the brightness of the display panel thereof. Therefore, a conventional digital camera includes a proximity sensor near the viewfinder, proximity of the face caused by the user looking through the viewfinder is detected by the proximity sensor, and the display panel is suspended according to the proximity detection thereof.

A digital camera serving as the personal digital assistant according to the present embodiment uses a touch panel provided to the display panel surface instead of the proximity sensor, and when the face of the user comes closer, the proximity thereof is detected to perform suspension of the display panel, and also suspension of the touch panel is performed.

[Software Structure for Executing Processing Based on Proximity Detection in Camera Application]

Figure 19:
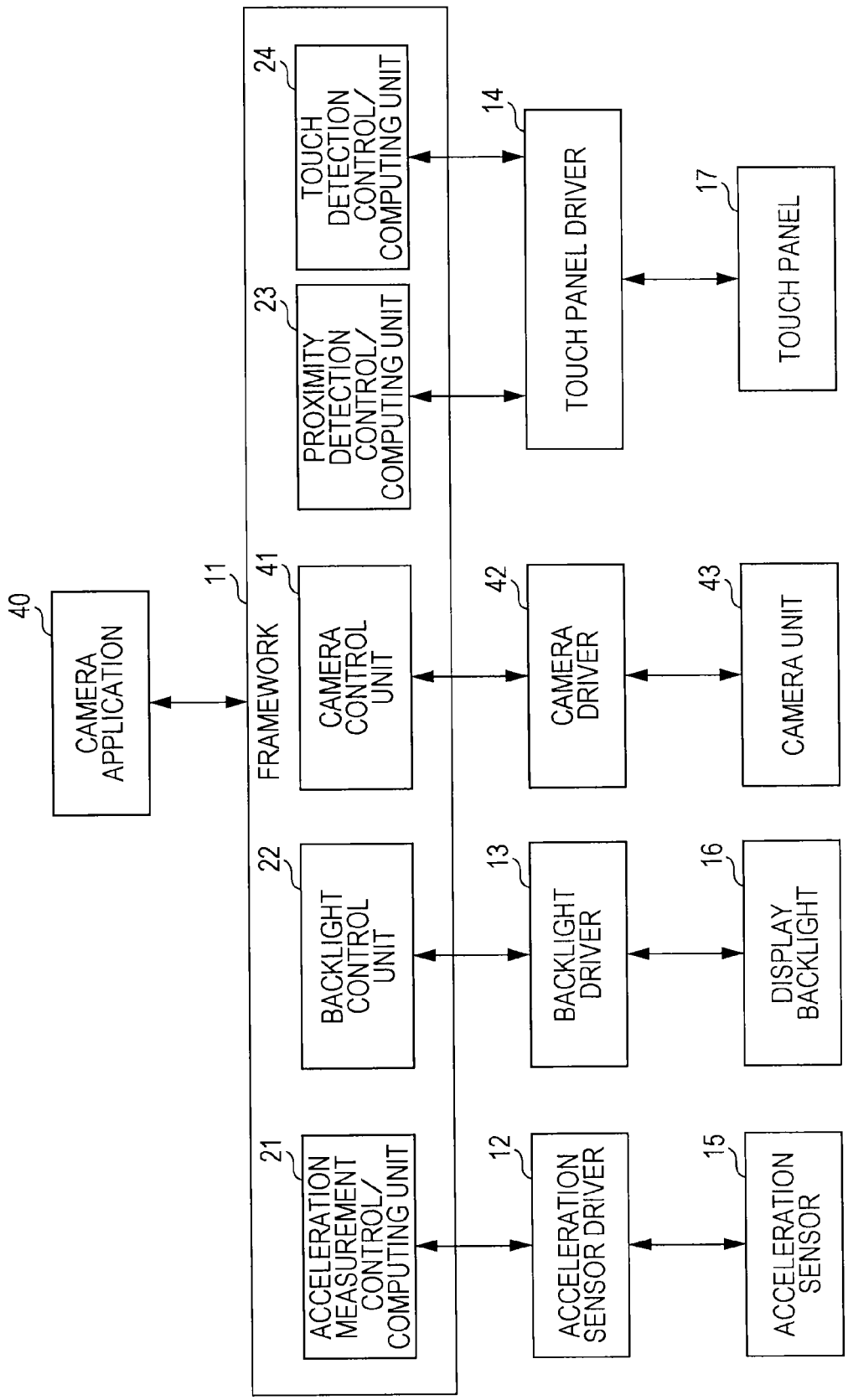
FIG. 19 is a schematic software structure diagram at the time of realizing processing for a camera application program suspending the display panel and touch panel based on an acceleration sensor detection signal and a proximity detection signal of the touch panel with the personal digital assistant according to the present embodiment.
Figure 20:
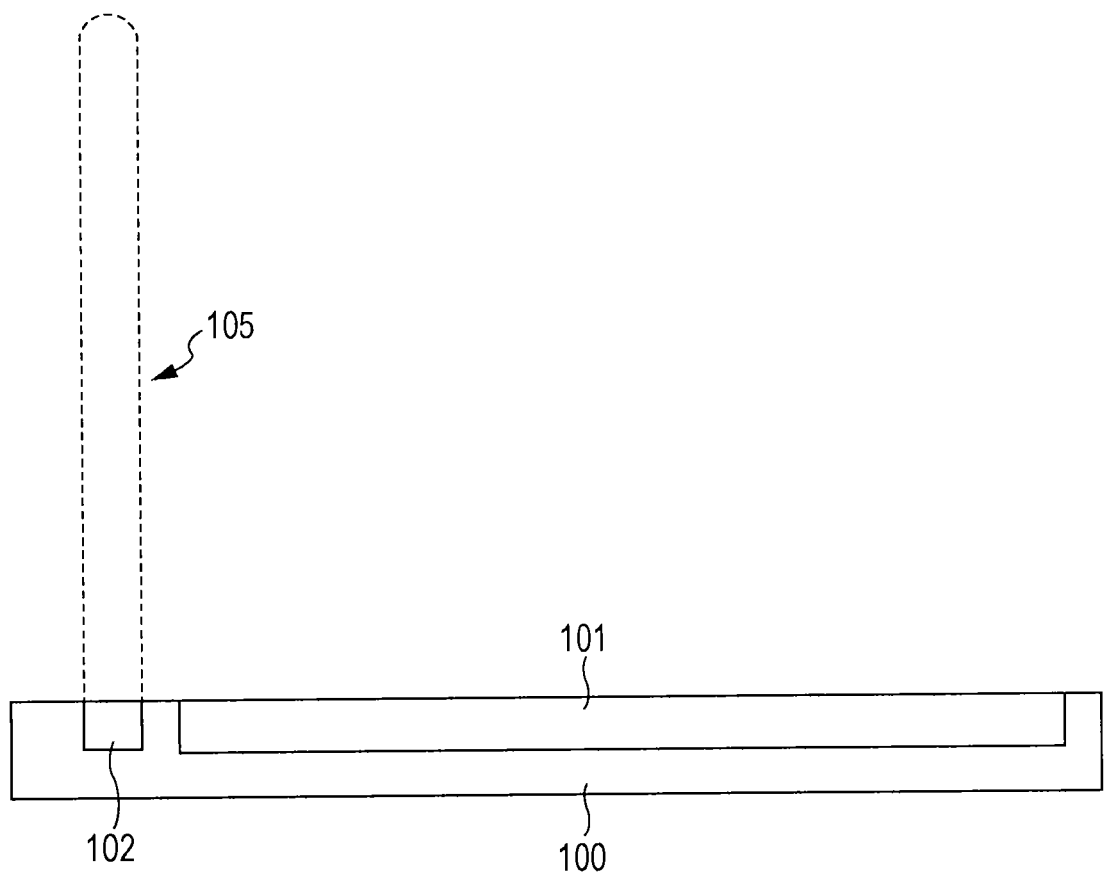
FIG. 20 is a schematic view schematically illustrating a detectable area of a proximity sensor in a state viewing a conventional personal digital assistant from the side face.
Figure 21:
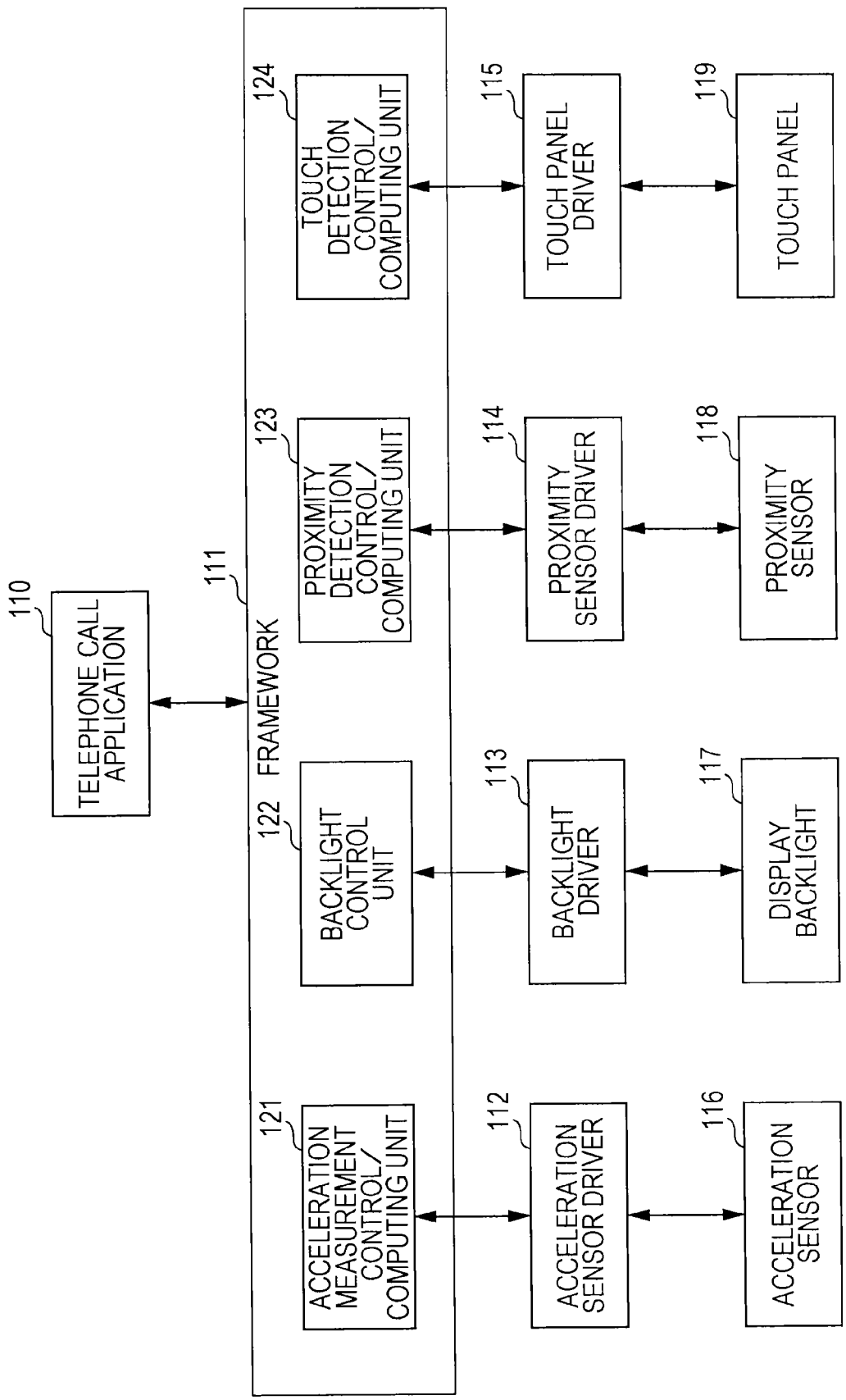
FIG. 21 is a schematic software structure diagram at the time of realizing processing for a phone call application program suspending the touch panel, and switching display indication based a proximity detection signal of a proximity sensor with a conventional personal digital assistant.
Figure 22:
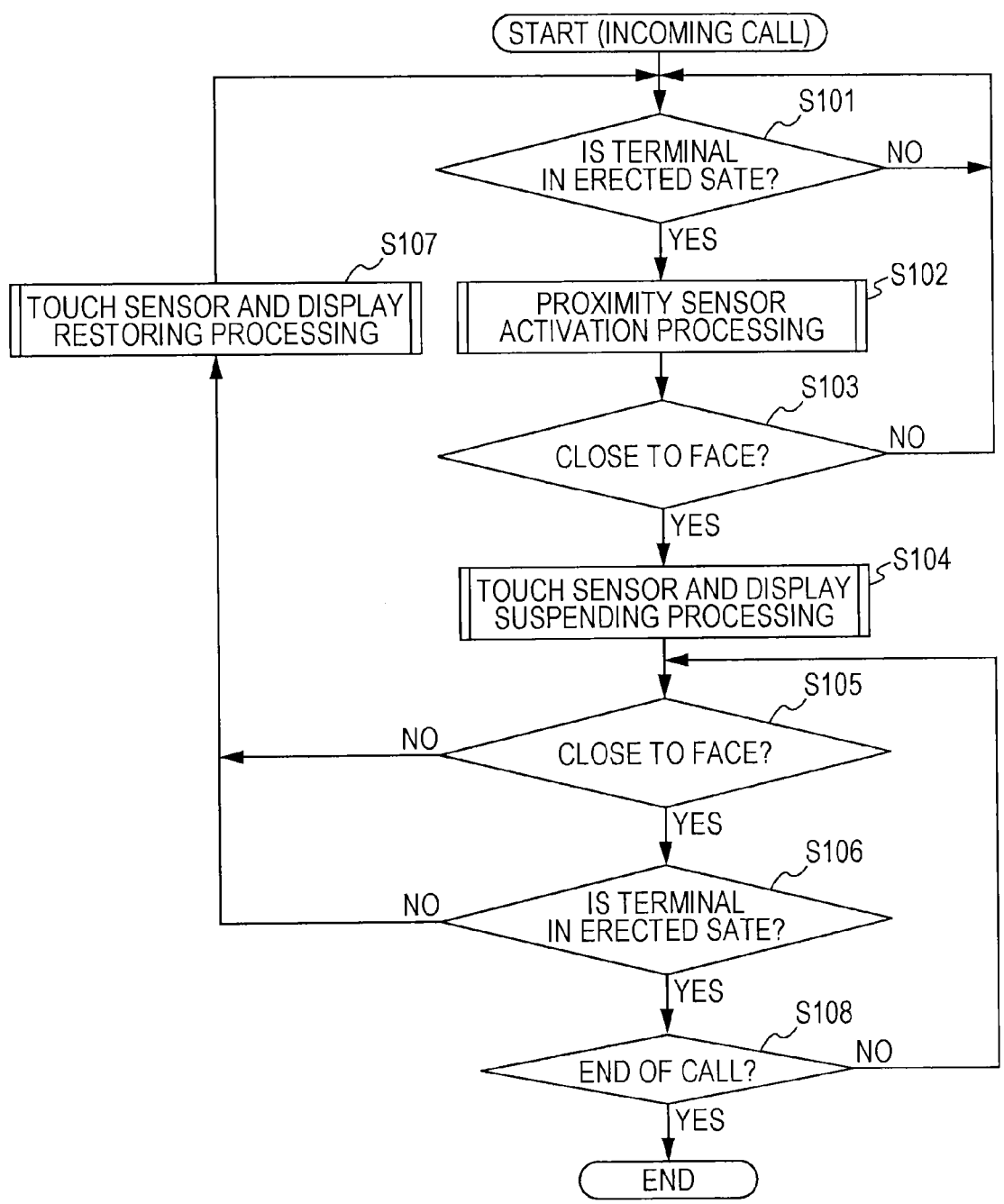
FIG. 22 is a schematic flowchart of at the time of realizing processing for the phone call application program suspending the display panel and touch panel based on a proximity detection signal of the proximity sensor with a conventional personal digital assistant.

FIG. 19 illustrates a schematic software structure diagram at the time of realizing processing for the camera application program 30 suspending, as described above, the touch panel, or switching the display image on the display based on the proximity detection signal at the touch panel, or the like. Note that, with this FIG. 19, the same structures as the structures in FIG. 10 and FIG. 18 are denoted with the same reference numerals, and description thereof will be omitted. With the software structure diagram shown in this FIG. 19, for convenience of description, in the same way as described above, the hardware configurations of the touch panel 17 (touch panel 73 in FIG. 1), acceleration sensor 15 (acceleration sensor 68 in FIG. 1), display backlight 16, and camera unit 43 (camera unit 63 in FIG. 1), are also drawn.

In this FIG. 19, the touch panel 17, touch panel driver 14, touch detection control/computing unit 24, and proximity detection control/computing unit 23 are the same as described above.

Also, the acceleration sensor 15, acceleration sensor driver 12, and acceleration measurement control/computing unit 21 are the same as described above, but in the case of this example, movement acceleration at the time of the user preparing this digital camera for photography, and so forth can be detected and measured, for example.

The display backlight 16, backlight driver 13, and backlight control unit 22 are the same as described above.

The camera unit 43 corresponds to the camera unit 63 in FIG. 1, and the camera driver 42 is driver software for controlling the photography operation of the camera unit 43. This camera driver 42 controls the photography operation at the camera unit 43 under control from the framework 11.

The framework 11 is configured of the proximity detection control/computing unit 23, acceleration measurement control/computing unit 21, backlight control unit 22, and touch detection control/computing unit 24 in the same way as described above as a software structure for executing setting of the proximity detection threshold and contact detection threshold of the touch panel 17, discrimination between the small object and the large object, processing according to the result of discrimination between the small object and the large object, touch panel suspending processing at the time of detection of the large object, and so forth in the same way as described above, based on the detection signals of the acceleration sensor 15 and touch panel 17. The camera application program can cooperate with these frameworks. Note that the camera control unit 41 of the framework 11 controls the photography operation at the camera unit 43 through the camera driver 42.

In the case of this example, with the framework 11, in the event that the user moved this digital camera for preparing, the acceleration measurement control/computing unit 21 detected the movement thereof, and further, the proximity detection control/computing unit 23 detected the proximity of the large object such as the user's face or the like, the touch detection control/computing unit 24 suspends the touch panel 17 through the touch panel driver 14, and the backlight control unit 22 executes processing for suspending the display backlight 16 via the backlight driver 13. Note that the functions of the framework in this example may be implemented in the touch panel signal processing unit 72, sensor control signal processing unit 67, backlight control unit 62, and so forth, or may be included in the control/computing unit 52.

[Advantage of Present Embodiment at Time of Executing Camera Application Program]

With the above embodiment, at the time of execution of the camera application program, the proximity of the large object, for example, such as a person's face or the like can be detected by the touch panel for user operation input without using a proximity sensor as with a conventional digital camera, whereby proximity such as a person's face or the like can be detected in a sure manner while additionally increasing reduction in costs, and available space on the terminal casing by eliminating the necessity of the conventional proximity sensor, and further predetermined processing such as suspending processing or the like can be executed without malfunction.

[General Overview]

A personal digital assistant according to an embodiment includes: a display panel unit including a display screen; a touch panel unit, which is additionally provided to the panel surface of the display panel unit, configured to detect approach and contact of an external conductor based on change in a capacitance value, and also to detect coordinate positions on the panel surface where the capacitance value has changed; and an operation control unit configured to measure the size of an area where the capacitance value has changed due to the external conductor coming closer to the touch panel unit, and when the size of this area is equal to or greater than a predetermined size, to temporarily stop the detection operation of coordinate positions due to contact of the external conductor at the touch panel unit, and also to cause the display panel unit to perform predetermined operation.

Also, the personal digital assistant according to an embodiment includes: a posture detecting unit configured to detect the posture of the own terminal within real space; with the operation control unit causing, when the posture detecting unit detects that the posture of the own terminal is in generally erected state within real space, the touch panel unit to perform the proximity detection operation of the external conductor.

Also, with the personal digital assistant according to an embodiment, the operation control unit turns off the display panel unit as the predetermined operation when the size of an area where the capacitance value has changed due to the external conductor coming closer to the touch panel unit is equal to or greater than the predetermined size.

Also, with the personal digital assistant according to an embodiment, the operation control unit releases temporal stop of the detection operation at the touch panel unit, and the predetermined operation of the display panel unit when detecting from change in the capacitance value that the external conductor has moved away from the touch panel unit after temporarily stopping the detection operation of the touch panel unit.

Also, with the personal digital assistant according to an embodiment, the operation control unit changes a cycle for detecting change in the capacitance value at the touch panel unit when the size of an area where the capacitance value has changed due to the external conductor coming closer to the touch panel unit is equal to or greater than the predetermined size.

An operation control method for a personal digital assistant according to an embodiment is an operation control method for a personal digital assistant including a display panel unit including a display screen, and a touch panel unit, which is additionally provided to the panel surface of the display panel unit, configured to detect approach and contact of an external conductor based on change in a capacitance value, and also to detect coordinate positions on the panel surface where the capacitance value has changed. The operation control method according to the embodiment includes a process for measuring the size of an area where the capacitance value has changed due to the external conductor coming closer to the touch panel unit, and a process for temporarily stopping, when the size of this area is equal to or greater than a predetermined size, the detection operation of coordinate positions due to contact of the external conductor at the touch panel unit, and also causing the display panel unit to perform predetermined operation.

Also, the operation control method according to an embodiment includes a process for detecting the posture of the own terminal within real space using a posture detecting unit, and when detecting that the posture of the own terminal is in a generally erected state within real space at the posture detecting unit, causes the touch panel unit to perform the proximity detection operation of the external conductor.

Also, the operation control method according to an embodiment turns off the display panel unit as the predetermined operation when the size of an area where the capacitance value has changed due to the external conductor coming closer to the touch panel unit is equal to or greater than the predetermined size.

Also, the operation control method according to an embodiment releases temporal stop of the detection operation at the touch panel unit, and the predetermined operation of the display panel unit when detecting from change in the capacitance value that the external conductor has moved away from the touch panel unit after temporarily stopping the detection operation of the touch panel unit.

Also, the operation control method according to an embodiment changes a cycle for detecting change in the capacitance value at the touch panel unit when the size of an area where the capacitance value has changed due to the external conductor coming closer to the touch panel unit is equal to or greater than the predetermined size.

An operation control program for a personal digital assistant according to an embodiment is an operation control program for a personal digital assistant including a display panel unit including a display screen, and a touch panel unit, which is additionally provided to the panel surface of the display panel unit, configured to detect approach and contact of an external conductor based on change in a capacitance value, and also to detect coordinate positions on the panel surface where the capacitance value has changed. The operation control program according to the embodiment causes a computer equipped to the personal digital assistant to serve as an area measuring unit for measuring the size of an area where the capacitance value has changed due to the external conductor coming closer to the touch panel unit, and as an operation control unit for temporarily stopping, when the size of this area is equal to or greater than a predetermined size, the detection operation of coordinate positions due to contact of the external conductor at the touch panel unit, and also causing the display panel unit to perform predetermined operation.

Also, the operation control program according to an embodiment causes a posture detecting unit to detect the posture of the own terminal within real space, when detecting at the posture detecting unit that the posture of the own terminal is in generally erected state within real space, and causes the touch panel unit to perform the proximity detection operation of the external conductor.

Also, the operation control program according to an embodiment turns off the display panel unit as the predetermined operation when the size of an area where the capacitance value has changed due to the external conductor coming closer to the touch panel unit is equal to or greater than the predetermined size.

Also, the operation control program according to an embodiment releases temporal stop of the detection operation at the touch panel unit, and the predetermined operation of the display panel unit when detecting from change in the capacitance value that the external conductor has moved away from the touch panel unit after temporarily stopping the detection operation of the touch panel unit.

Also, the operation control program according to an embodiment changes a cycle for detecting change in the capacitance value at the touch panel unit when the size of an area where the capacitance value has changed due to the external conductor coming closer to the touch panel unit is equal to or greater than the predetermined size.

A storage medium according to an embodiment is a storage medium in which there is stored an operation control program for a personal digital assistant including a display panel unit including a display screen, and a touch panel unit, which is additionally provided to the panel surface of the display panel unit, configured to detect approach and contact of an external conductor based on change in a capacitance value, and also to detect coordinate positions on the panel surface where the capacitance value has changed. The operation control program according to the embodiment causes a computer equipped to the personal digital assistant to serve as an area measuring unit for measuring the size of an area where the capacitance value has changed due to the external conductor coming closer to the touch panel unit, and as an operation control unit for temporarily stopping, when the size of this area is equal to or greater than a predetermined size, the detection operation of coordinate positions due to contact of the external conductor at the touch panel unit, and also causing the display panel unit to perform predetermined operation.

As described above, with the personal digital assistant according to an embodiment, the use of the touch panel is not restricted to detection of coordinates of contact or the like, and the touch panel is also used for detection of a large object such as a person's face or hand or the like, whereby proximity detection of the large object can be performed without using a conventional proximity sensor at the time of executing a predetermined application program. Thus, according to the present embodiment, necessity for a conventional proximity sensor is eliminated, which enables reduction in costs, and also, the proximity sensor is not employed, whereby additional available space on the terminal casing can be increased. Also, a proximity detection function according to the touch panel has an infinitely wider detection area than that of a conventional proximity sensor. According to these, according to the present embodiment, approach of a person's face or the like can be detected in a sure manner, and further, predetermined processing such as suspending processing can be executed without malfunction.

Note that the personal digital assistant according to the present embodiment, which includes a proximity detection function of the large object and a suspending function of the touch panel as described above, may be applied to, in addition to high-performance portable telephone terminals, tablet terminals, or slate PCs, not only portable terminals, for example, such as so-called PDAs (Personal Digital Assistants), notebook-sized personal computers, portable game machines, portable navigation terminals, and so forth, but also various stationary electronic devices, including a touch panel.

Also, the description of the above embodiment is an example. Accordingly, the claimed invention is not restricted to the above-described embodiment, and it goes without saying that various modifications can be made according to a design or the like without departing from the technical idea relating to the present specification.

Further, it is apparent to one skilled in the art that various modifications, combinations, and other embodiments can be made with design or other elements within the scope of the present embodiments.

[Reference Signs List]

1 personal digital assistant, 2 display panel, 3 capacitance change detectable area, 4, 5 large object, 10 phone call application program, 11 framework, 12 acceleration sensor driver, 13 backlight driver, 14 touch panel driver, 15 acceleration sensor, 16 display backlight, 17 tough panel, 21 acceleration measurement control/computing unit, 22 backlight control unit, 23 proximity detection control/computing unit, 24 touch panel detection control/computing unit, 30 electronic wallet application program, 32 display indication control unit, 35 display driver, 36 display panel, 37 noncontact communication control unit, 38 noncontact communication driver, 39 noncontact communication module, 40 camera application program, 41 camera control unit, 42 camera driver, 43 camera unit, 50 communication antenna, 51 communication unit, 52 control unit/computing unit, 53 memory unit, 54 GPS module, 55 short-distance wireless communication module, 56 digital broadcast reception module, noncontact communication module, 58 external memory interface unit, 59 external memory, 60 video signal processing unit, 61 display panel, 62 backlight control unit, 63 camera unit, 64 audio signal processing unit, 65 speaker, 66 microphone, 67 sensor control signal processing unit, acceleration sensor 68, 69 other sensors, external input/output terminal unit, 71 key operating unit, 72 touch panel control signal processing unit, 73 touch panel.

What is claimed is:

1. A terminal apparatus comprising:
    a touch panel that is integrated with a display;
    a proximity detector configured to detect an approach and contact of an external object to the touch panel based on a changed in capacitance value and to detect a location on a surface of the touch panel where the capacitance value changed; and
    an operation controller configured to stop the detection of a location contacted by the external object on the touch panel surface when the approach of the external object is detected by the proximity detector,
    wherein the operation controller measures a size of an area where the capacitance value has changed and detects a capacitance detection level in the area, and controls the proximity detector to stop the detection of a location contacted by the external object on the touch panel surface when the measured size of the area is equal to or greater than a predetermined size and the capacitance detection level is greater than a first predetermined threshold and less than a second predetermined threshold,
    wherein the terminal apparatus further comprises a noncontact communicator configured to perform an electronic payment transaction with an external non-contact communication reader/writer,
    wherein the proximity detector starts detecting the approach and contact of the external object to the touch panel when an electronic payment application is started on the terminal apparatus in which the electronic payment transaction is performed, and while performing the electronic payment transaction with the external non-contact communication reader/writer, the operational controller is configured to control display of a message on a portion of the display that is determined to be unobstructed by the external object.

2. The terminal apparatus according to claim 1, wherein the proximity detector starts detecting the approach and contact of the external object to the touch panel when a predetermined application other than the electronic payment application is started on the terminal apparatus.

3. The terminal apparatus according to claim 2, wherein the operation controller is configured to control the proximity detector to resume detection of a location contacted by the external object on the touch panel surface when the external object is detected to move away from the touch panel and while the predetermined application is still running on the terminal apparatus.

4. The terminal apparatus according to claim 2, further comprising a camera configured to take images, wherein the predetermined application is a camera application.

5. The terminal apparatus according to claim 1, wherein the operation controller is configured to stop a display function of the display when the approach of the external object is detected by the proximity detector.

6. The terminal apparatus according to claim 1, wherein a scan rate of the touch panel is decreased from a first scan rate to a second scan rate, that is less than the first scan rate and is greater than zero, when the approach of the external object is detected by the proximity detector.

7. The terminal apparatus according to claim 1, wherein the terminal apparatus includes a phone call application, and the operation controller stops the detection of a location contacted on the touch panel surface when the approach of the external object is detected by the proximity detector during a phone call, and the operation controller is configured to resume detection of a location contacted on the touch panel surface when the external object is detected to move away from the touch panel or when the phone call is completed, and the terminal apparatus further comprises a posture detector configured to detect a position of the terminal apparatus within real space, and the proximity detector starts detecting the approach and contact of the external object to the touch panel when the posture detector detects that the terminal apparatus is in a generally vertical or upright position with respect to a ground level, and the posture detector starts detecting the position of the terminal apparatus when the phone call is received at the terminal apparatus.

8. A method, implemented on a terminal apparatus having a touch panel that is integrated with a display, comprising:

detecting, by a proximity detector, an approach and contact of an external object to the touch panel based on a changed in capacitance value;

detecting a location on a surface of the touch panel where the capacitance value changed; and stopping the detection of a location contacted by the external object on the touch panel surface when the approach of the external object is detected, the method further including measuring a size of an area where the capacitance value has changed and detecting a capacitance detection level in the area, and the stopping includes stopping the detection of a location contacted by the external object on the touch panel surface when the measured size of the area is equal to or greater than a predetermined size and the capacitance detection level is greater than a first predetermined threshold and less than a second predetermined threshold, wherein the terminal apparatus further comprises a non-contact communicator configured to perform an electronic payment transaction with an external non-contact communication reader/writer, and the method includes detecting the approach and contact of the external object to the touch panel when an electronic payment application is started on the terminal apparatus in which the electronic payment transaction is performed, and while performing the electronic payment transaction with the external non-contact communication reader/writer, the method includes controlling display of a message on a portion of the display that is determined to be unobstructed by the external object.

9. A non-transitory computer readable storage medium encoded with computer executable instructions, which when executed by a terminal apparatus having a touch panel that is integrated with a display, cause the terminal apparatus to perform a method comprising:

detecting an approach and contact of an external object to the touch panel based on a changed in capacitance value;

detecting a location on a surface of the touch panel where the capacitance value changed; and stopping the detection of a location contacted by the external object on the touch panel surface when the approach of the external object is detected, the method further including measuring a size of an area where the capacitance value has changed and detecting a capacitance detection level in the area, and the stopping includes stopping the detection of a location contacted by the external object on the touch panel surface when the measured size of the area is equal to or greater than a predetermined size and the capacitance detection level is greater than a first predetermined threshold and less than a second predetermined threshold, wherein the terminal apparatus further comprises a non-contact communicator configured to perform an electronic payment transaction with an external non-contact communication reader/writer, and the method includes detection the approach and contact of the external object to the touch panel when an electronic payment application is started on the terminal apparatus in which the electronic payment transaction is performed, and while performing the electronic payment transaction with the external non-contact communication reader/writer, the method includes controlling display of a message on a portion of the display that is determined to be unobstructed by the external object.

* * * * *